(12) United States Patent
Adachi et al.

(10) Patent No.: US 10,063,472 B2
(45) Date of Patent: *Aug. 28, 2018

(54) WIRELESS COMMUNICATION TERMINAL

(71) Applicant: KABUSHIKI KAISHA TOSHIBA, Minato-ku, Tokyo (JP)

(72) Inventors: Tomoko Adachi, Kawasaki (JP); Takeshi Tomizawa, Yokohama (JP); Tomoya Tandai, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/380,481

(22) Filed: Dec. 15, 2016

(65) Prior Publication Data
US 2017/0099220 A1    Apr. 6, 2017

Related U.S. Application Data

(60) Continuation of application No. 14/798,954, filed on Jul. 14, 2015, now Pat. No. 9,544,227, which is a
(Continued)

(30) Foreign Application Priority Data

Feb. 4, 2011    (JP) ................................. 2011-023216

(51) Int. Cl.
*H04W 28/06* (2009.01)
*H04L 1/00* (2006.01)
(Continued)

(52) U.S. Cl.
CPC .............. *H04L 45/74* (2013.01); *H04B 1/44* (2013.01); *H04L 1/0083* (2013.01);
(Continued)

(58) Field of Classification Search
CPC ..... H04L 45/74; H04L 1/0083; H04L 1/1621; H04B 1/44; H04W 28/06; H04W 88/02
See application file for complete search history.

(56) References Cited

U.S. PATENT DOCUMENTS 5,568,476 A    10/1996   Sherer et al.
5,592,538 A *   1/1997   Kosowsky ............. H04M 11/06
                                                    379/355.04
(Continued)

FOREIGN PATENT DOCUMENTS

JP         8242243 A    9/1996
JP      200128565 A    1/2001
(Continued)

OTHER PUBLICATIONS

U.S. Appl. No. 13/343,336, filed Jan. 4, 2012; First Named Inventor: Tomoya Horiguchi; Title: Wireless Communication Device and Communication Program.
(Continued)

*Primary Examiner* — Rasheed Gidado
(74) *Attorney, Agent, or Firm* — Holtz, Holtz & Volek PC

(57) ABSTRACT

A wireless communication terminal including a transmitter which transmits, to an external device, a frame including n frame sets each including a subheader field, a frame check sequence field, and a frame body field including data, where n is an integer of two or more. The subheader field includes a sequence number field which notifies a sequence number; a more fragment field which notifies whether or not the data is a last fragment; and a frame body length field which notifies a length of the frame body field. A receiver receives, from the external device, a response frame notifying a successively and successfully received maximum sequence number which indicates a highest sequence number among sequence numbers indicated in sequence number fields of frame sets which have been successively and successfully
(Continued)

received by the external device among the n frame sets included in the transmitted frame. The receiver receives one response frame per transmitted frame, even if more than two frame sets among the n frame sets have been successfully received.

22 Claims, 12 Drawing Sheets

Related U.S. Application Data continuation of application No. 14/176,917, filed on Feb. 10, 2014, now Pat. No. 9,112,814, which is a division of application No. 13/223,688, filed on Sep. 1, 2011, now Pat. No. 8,705,422.

(51) Int. Cl.
| | |
|---|---|
| H04L 12/741 | (2013.01) |
| H04B 1/44 | (2006.01) |
| H04L 1/16 | (2006.01) |
| H04W 52/02 | (2009.01) |
| H04W 88/02 | (2009.01) |
| H04W 28/04 | (2009.01) |

(52) U.S. Cl.
CPC ............ *H04L 1/1621* (2013.01); *H04W 28/06* (2013.01); *H04W 52/0216* (2013.01); *H04W 88/02* (2013.01); *H04W 28/04* (2013.01); *Y02D 70/00* (2018.01); *Y02D 70/142* (2018.01)

(56) References Cited

U.S. PATENT DOCUMENTS

| | | | |
|---|---|---|---|
| 5,974,028 A | 10/1999 | Ramakrishnan et al. | |
| 6,301,249 B1* | 10/2001 | Mansfield | H04L 1/1635 370/394 |
| 6,400,724 B1* | 6/2002 | Yao | H04L 1/08 370/412 |
| 6,463,096 B1 | 10/2002 | Raleigh et al. | |
| 6,839,338 B1* | 1/2005 | Amara | H04L 63/0227 370/338 |
| 6,961,327 B2* | 11/2005 | Niu | H04L 47/10 370/338 |
| 6,990,069 B1* | 1/2006 | Ramakrishnan | H04L 1/1614 370/229 |
| 7,072,973 B1* | 7/2006 | Newson | G06F 13/387 709/232 |
| 7,142,540 B2 | 11/2006 | Hendel et al. | |
| 7,328,026 B2 | 2/2008 | Gu et al. | |
| 7,379,494 B2 | 5/2008 | Raleigh et al. | |
| 7,395,481 B2* | 7/2008 | Chintada | H04L 1/1848 714/748 |
| 7,496,076 B2 | 2/2009 | Takagi et al. | |
| 7,650,559 B2 | 1/2010 | Nishibayashi et al. | |
| 7,668,143 B2 | 2/2010 | Otsuki et al. | |
| 7,675,893 B2 | 3/2010 | Takagi et al. | |
| 7,697,561 B2 | 4/2010 | Nishibayashi et al. | |
| 7,706,408 B2 | 4/2010 | Takagi et al. | |
| 7,743,310 B2 | 6/2010 | Nishibayashi et al. | |
| 7,746,842 B2* | 6/2010 | Sugaya | H04L 1/1614 370/349 |
| 7,752,519 B2 | 7/2010 | Ryu et al. | |
| 7,856,031 B2 | 12/2010 | Kwon et al. | |
| 7,898,962 B2 | 3/2011 | Hiddink et al. | |
| 8,180,409 B2 | 5/2012 | Karaoguz | |
| 8,254,867 B2 | 8/2012 | Kwon et al. | |
| 8,347,199 B2 | 1/2013 | Lawson et al. | |
| 8,612,752 B2 | 12/2013 | Batta | |
| 8,699,337 B2 | 4/2014 | Shimonishi | |
| 8,804,600 B2 | 8/2014 | Suda | |
| 2003/0220076 A1 | 11/2003 | Katayama et al. | |
| 2004/0141503 A1 | 7/2004 | Sinha et al. | |
| 2005/0265302 A1 | 12/2005 | Nishibayashi et al. | |
| 2006/0034248 A1* | 2/2006 | Mishra | H04L 1/1628 370/349 |
| 2006/0218264 A1 | 9/2006 | Ogawa et al. | |
| 2006/0280204 A1 | 12/2006 | Nagata et al. | |
| 2007/0047574 A1 | 3/2007 | Ling et al. | |
| 2008/0037420 A1 | 2/2008 | Tang | |
| 2008/0062957 A1 | 3/2008 | Narasimha et al. | |
| 2008/0070614 A1 | 3/2008 | Ogushi et al. | |
| 2008/0240322 A1 | 10/2008 | Date et al. | |
| 2009/0089577 A1 | 4/2009 | Shon et al. | |
| 2009/0193310 A1 | 7/2009 | Hashimoto et al. | |
| 2009/0268747 A1 | 10/2009 | Kurata et al. | |
| 2009/0291639 A1 | 11/2009 | Namekawa et al. | |
| 2010/0046437 A1 | 2/2010 | Nishibayashi et al. | |
| 2010/0046518 A1 | 2/2010 | Takagi et al. | |
| 2010/0098033 A1 | 4/2010 | Lee et al. | |
| 2010/0128645 A1 | 5/2010 | Lin et al. | |
| 2010/0166015 A1* | 7/2010 | van Greunen | H04L 1/0007 370/474 |
| 2010/0220639 A1 | 9/2010 | Sugaya et al. | |
| 2010/0232432 A1 | 9/2010 | Joung et al. | |
| 2010/0232432 A1 | 9/2010 | Takagi et al. | |
| 2012/0026905 A1 | 2/2012 | Sugiyama et al. | |
| 2012/0027027 A1 | 2/2012 | Yamaura et al. | |
| 2012/0106535 A1 | 5/2012 | Horiguchi | |
| 2012/0201177 A1 | 8/2012 | Adachi et al. | |
| 2014/0177462 A1 | 6/2014 | Okada et al. | |
| 2014/0198658 A1 | 7/2014 | Ajima et al. | |

FOREIGN PATENT DOCUMENTS

| | | |
|---|---|---|
| JP | 2002300175 A | 10/2002 |
| JP | 2003087185 A | 3/2003 |
| JP | 2003244166 A | 8/2003 |
| JP | 2004320153 A | 11/2004 |
| JP | 2004343567 A | 12/2004 |
| JP | 2005117349 A | 4/2005 |
| JP | 2005198214 A | 7/2005 |
| JP | 2005252897 A | 9/2005 |
| JP | 2005318487 A | 11/2005 |
| JP | 2005341441 A | 12/2005 |
| JP | 2006042322 A | 2/2006 |
| JP | 2006054673 A | 2/2006 |
| JP | 2006352897 A | 12/2006 |
| JP | 2007520113 A | 7/2007 |
| JP | 2007267082 A | 10/2007 |
| JP | 2008227855 A | 9/2008 |
| JP | 2008258756 A | 10/2008 |
| JP | 2009278267 A | 11/2009 |
| JP | 2009284355 A | 12/2009 |
| JP | 2010206304 A | 9/2010 |
| JP | 2012165139 A | 8/2012 |
| JP | 5475790 B2 | 4/2014 |
| WO | 1333618 A2 | 8/2003 |

OTHER PUBLICATIONS

U.S. Appl. No. 13/724,618, filed Dec. 21, 2012; First Named Inventor: Tomoko Adachi; Title: Wireless Communication Apparatus and Method.

Information Sciences Institute University of Southern California, "RFC 793 Transmission Control Protocol," Sep. 1981.

* cited by examiner

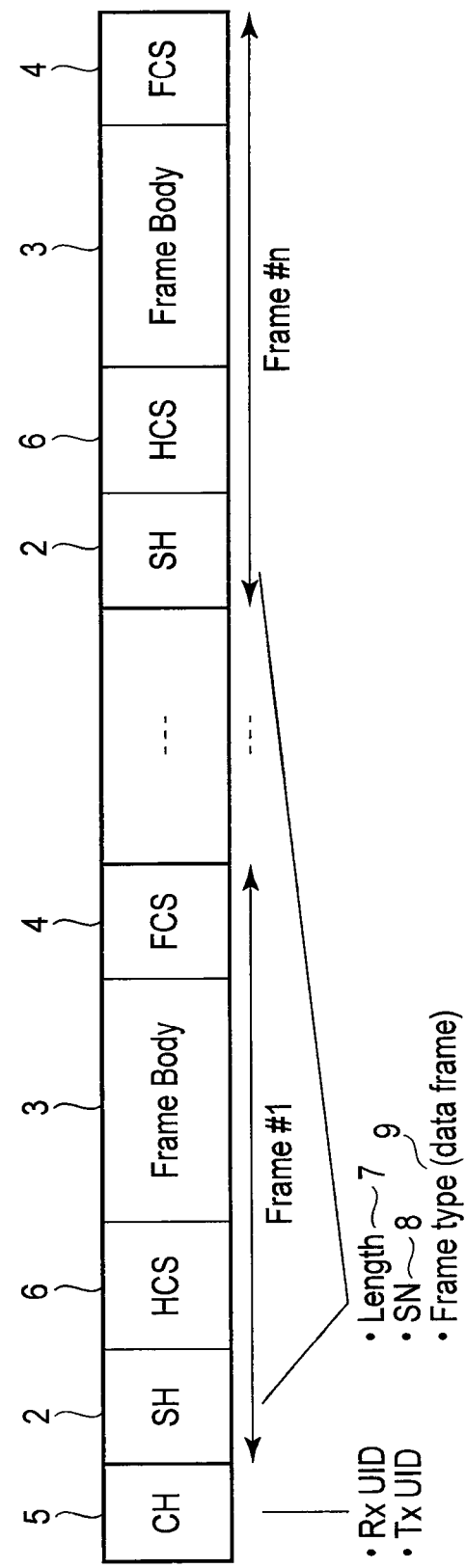
F I G. 1

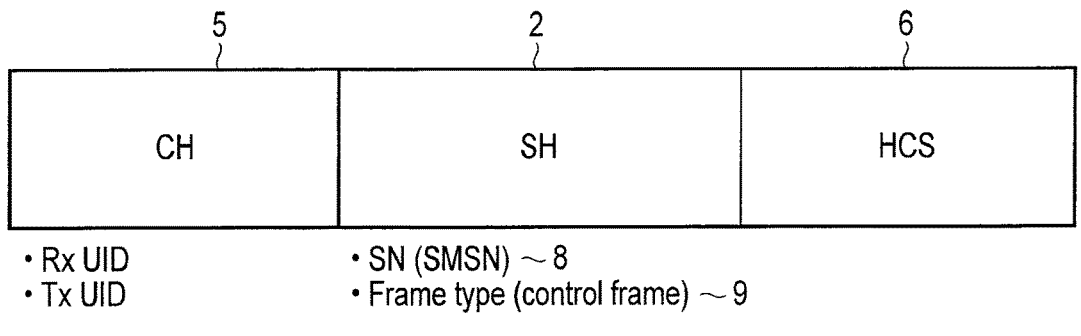
F I G. 2
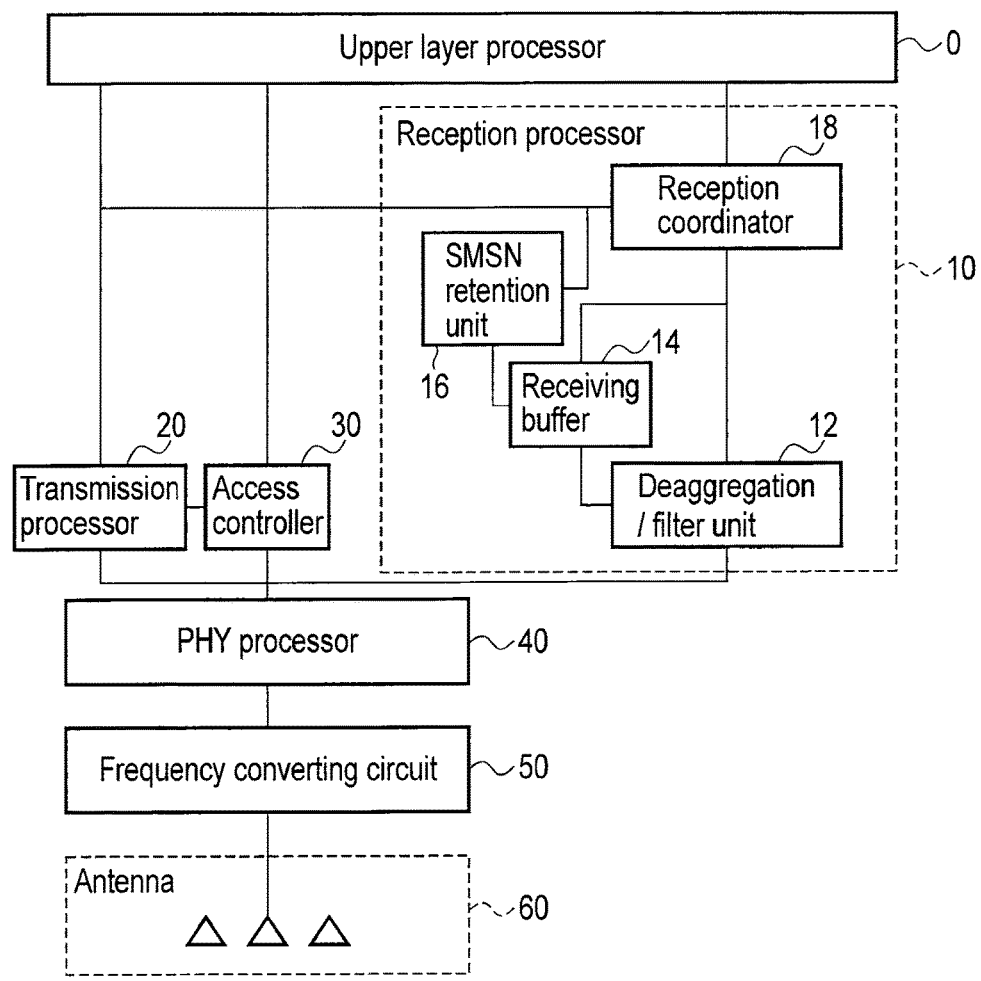
F I G. 3

| CH | SH1 | FB1 | SH2 | FB2 | SH3 | FB3 | SH4 | FB4 |
|---|---|---|---|---|---|---|---|---|
| ○ | ○ | ○ | ○ | ○ | ○ | ○ | × | × |

F I G. 4

| CH | SH1 | FB1 | SH2 | FB2 | SH3 | FB3 | SH4 | FB4 |
|---|---|---|---|---|---|---|---|---|
| ○ | ○ | ○ | ○ | ○ | ○ | × | × | × |

F I G. 5

| CH | SH1 | FB1 | SH2 | FB2 | SH3 | FB3 | SH4 | FB4 |
|---|---|---|---|---|---|---|---|---|
| ○ | × | × | × | × | × | × | ○ | ○ |

F I G. 6

| CH | SH1 | FB1 | SH2 | FB2 | SH3 | FB3 | SH4 | FB4 |
|---|---|---|---|---|---|---|---|---|
| ○ | × | × | × | × | × | × | ○ | × |

F I G. 7

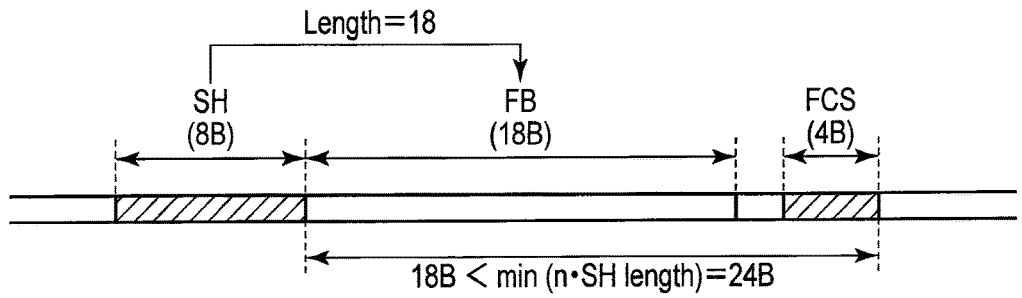
FIG. 9
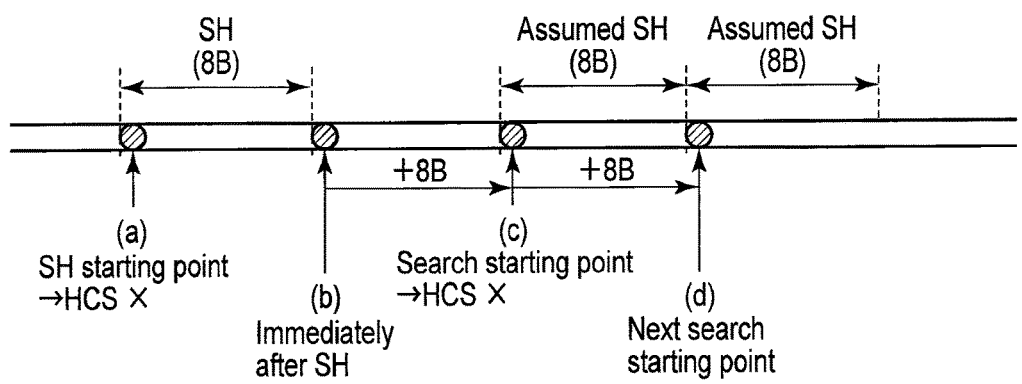
FIG. 10
| CH | SH | HCS |
|---|---|---|
| • Rx UID<br>• Tx UID | • Understanding of sequence start (SYNC)<br>• SN (SMSN)<br>• Frame type (control frame) | |
FIG. 11

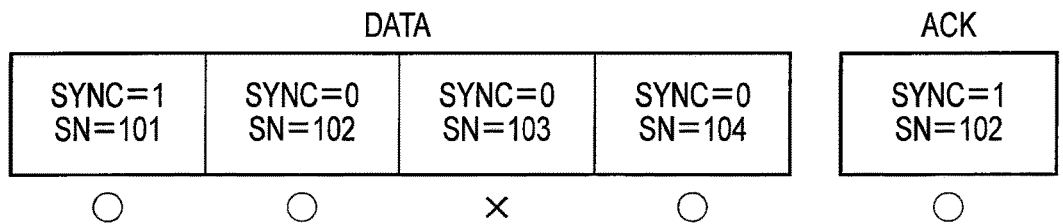
F I G. 1 2
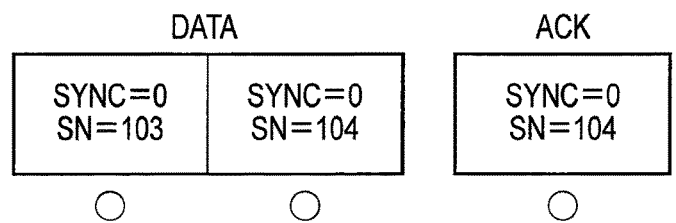
F I G. 1 3
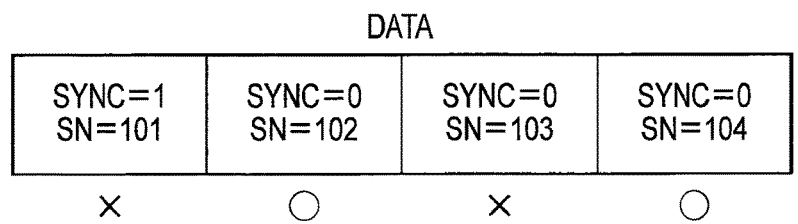
F I G. 1 4

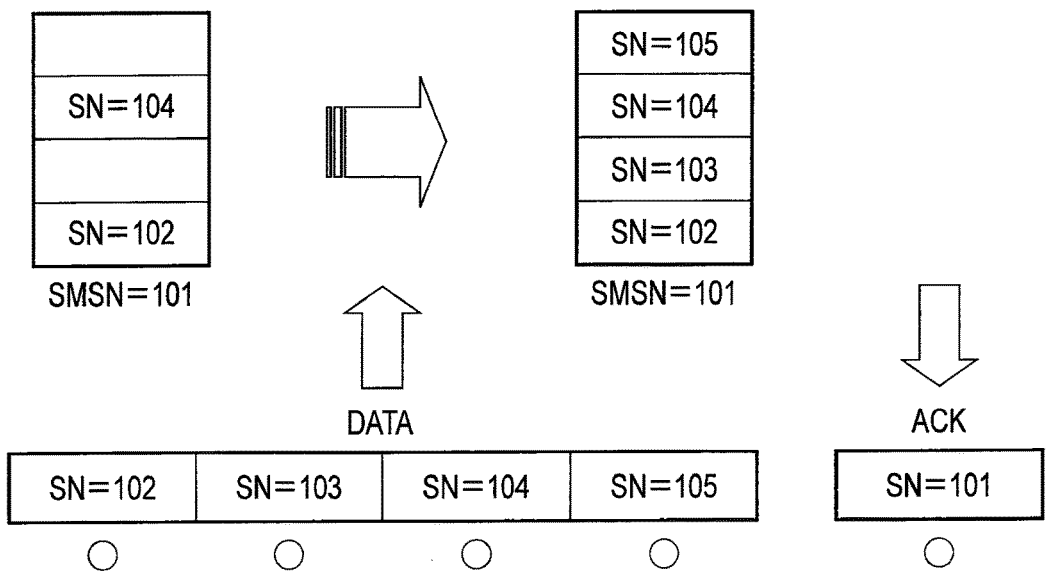
F I G. 20
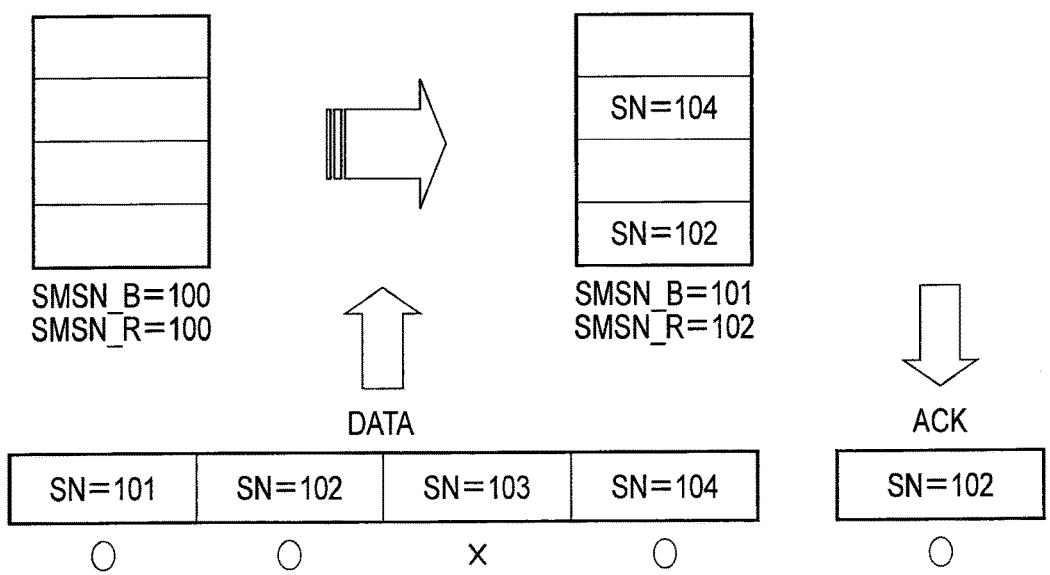
F I G. 21

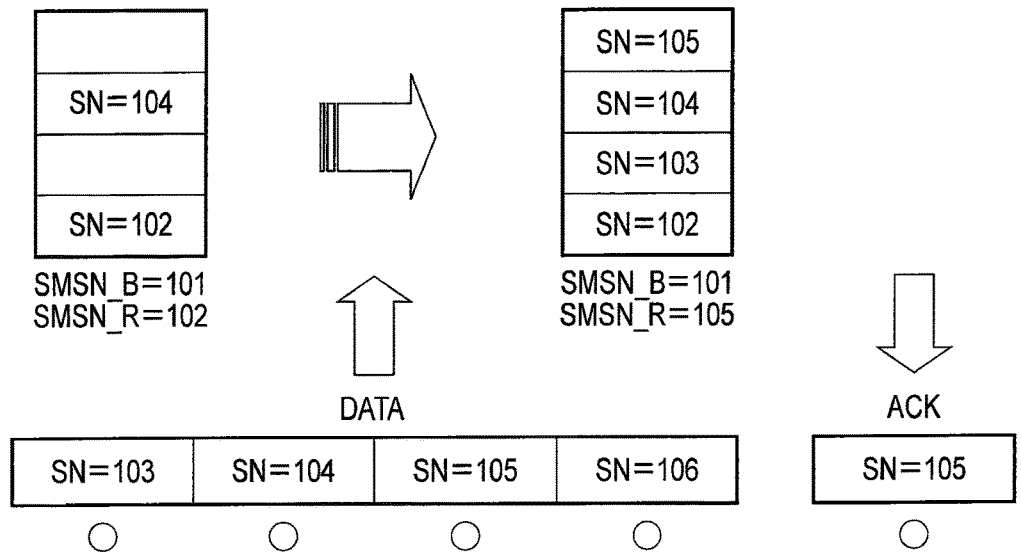
F I G. 2 2
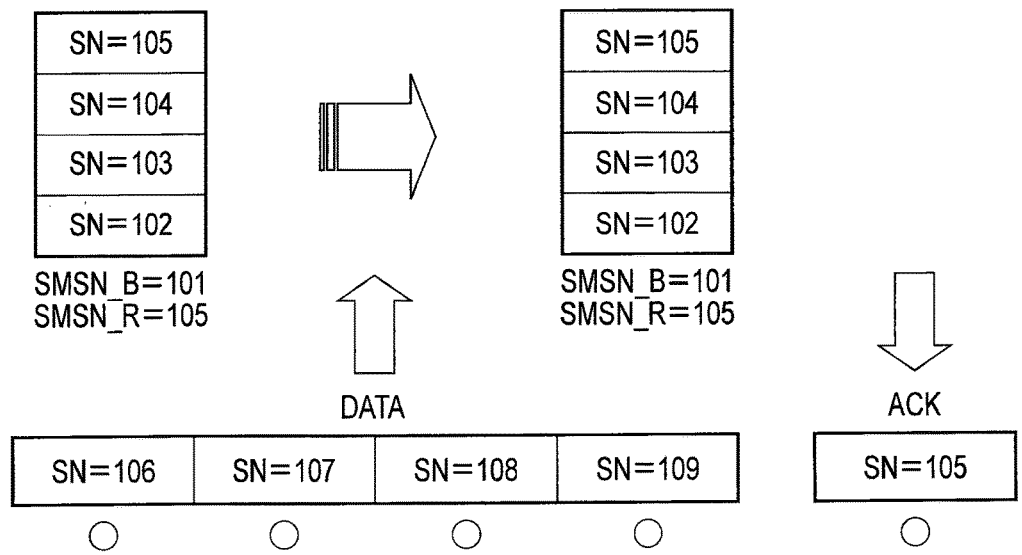
F I G. 2 3

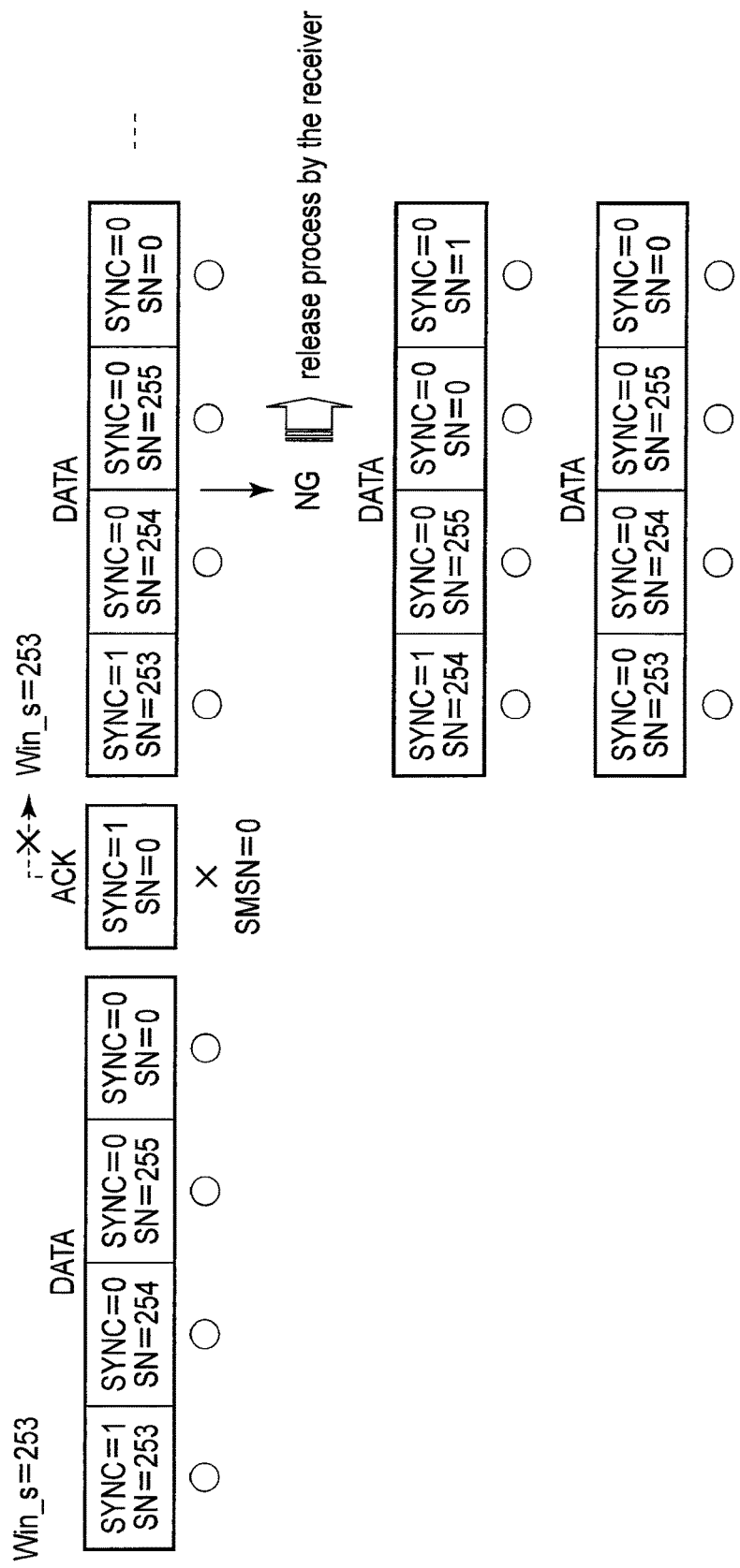
F I G. 24

```
if (Sync1==0)
  if (head SYNC==1 && later no SYNC==1)
    OK; Start SN = (SYNC=1  SN); Sync1+-;
  else NG;
else
  if (Sync==1)
    if (head SYNC==1 &&  later no SYNC==1)
      if (Start SN == (SYNC=1  SN))
        OK; Sync1 = Sync1;
      else NG;
    else
      if (all SYNC==0)
        if (Start SN < minimum SN)
          OK; Sync1++;
        else NG;
      else NG;
  else /* Sync1==2 */
    if (all SYNC==0)
      OK; Sync1 = Sync1;
    else NG;
```

FIG. 25

WIRELESS COMMUNICATION TERMINAL

CROSS-REFERENCE TO RELATED APPLICATIONS

This is a Continuation of U.S. application Ser. No. 14/798,954, filed Jul. 14, 2015, which is a Continuation of U.S. application Ser. No. 14/176,917, filed Feb. 10, 2014, now U.S. Pat. No. 9,112,814, which is a Divisional of U.S. application Ser. No. 13/223,688, filed Sep. 1, 2011, now U.S. Pat. No. 8,705,422, which is based upon and claims the benefit of priority from prior Japanese Patent Application No. 2011-023216, filed Feb. 4, 2011, the entire contents of all of which are incorporated herein by reference.

FIELD

Embodiments described herein relate generally to a wireless communication terminal that performs frame exchange using an acknowledgement.

BACKGROUND

For example, there is a method in which a sequence starting number and a fixed-length bitmap are used as a method for indicating the acknowledgement to plural data frames by one response frame. Each acknowledgement to the data frame of a relative sequence number from the sequence starting number is displayed in the fixed-length bitmap.

BRIEF DESCRIPTION OF THE DRAWINGS

FIG. 1 shows a data frame format according to a first embodiment;

FIG. 2 shows an acknowledgement frame format of the first embodiment;

FIG. 3 shows a configuration of a wireless communication terminal of the first embodiment;

FIG. 4 shows a concrete receiving state of a data frame of the first embodiment;

FIG. 5 shows another concrete receiving state of a data frame of the first embodiment;

FIG. 6 shows still another concrete receiving state of a data frame of the first embodiment;

FIG. 7 shows still another concrete receiving state of a data frame of the first embodiment;

FIG. 9 explains a method for extracting a frame body field and an FCS field of the first embodiment;

FIG. 10 explains process of searching an SH field of the first embodiment;

FIG. 11 shows an acknowledgement frame format according to a second embodiment;

FIG. 12 shows a concrete exchange of a data frame and an acknowledgement frame of the second embodiment;

FIG. 13 shows another concrete exchange of a data frame and an acknowledgement frame of the second embodiment;

FIG. 14 shows still another concrete exchange of a data frame and an acknowledgement frame of the second embodiment;

FIG. 20 shows another example of a relationship among the states of the receiving buffer and the SMSN retention unit, the reception of a data frame, and the transmission of an acknowledgement frame of the seventh embodiment;

FIG. 21 shows an example of a relationship among states of a receiving buffer and an SMSN retention unit, reception of a data frame, and transmission of an acknowledgement frame according to a ninth embodiment;

FIG. 22 shows another example of a relationship among the states of the receiving buffer and the SMSN retention unit, the reception of a data frame, and the transmission of an acknowledgement frame of the ninth embodiment;

FIG. 23 shows still another example of a relationship among the states of the receiving buffer and the SMSN retention unit, the reception of a data frame, and the transmission of an acknowledgement frame of the ninth embodiment;

FIG. 24 shows an example of a concrete exchange of a data frame and an acknowledgement frame according to a twelfth embodiment; and FIG. 25 shows an example of an algorithm for determining whether an indication bit used to indicate start of a sequence number is correctly used according to the twelfth embodiment.

DETAILED DESCRIPTION

Figure 8:
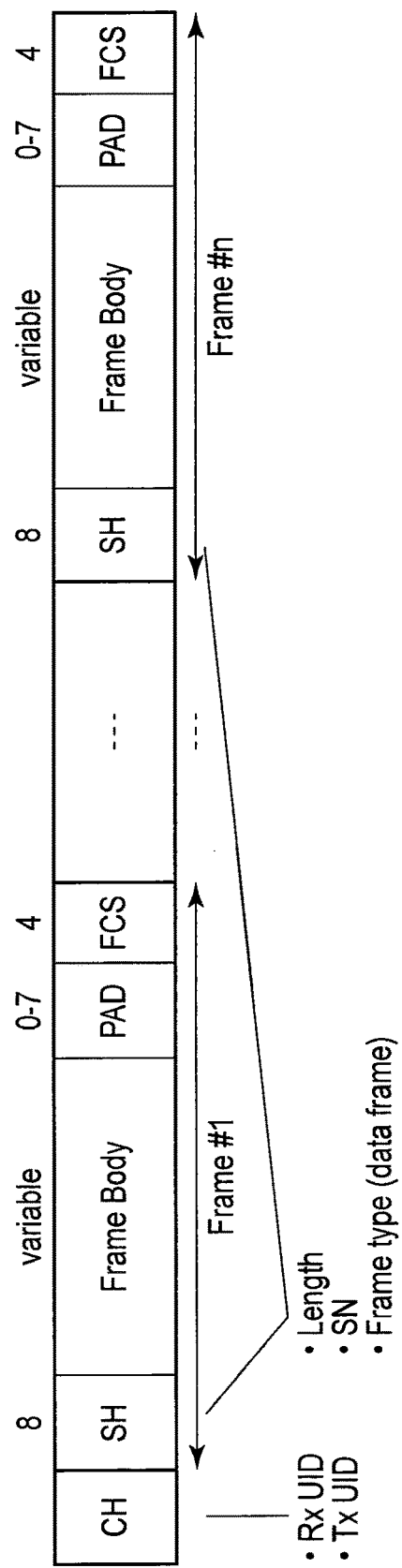
FIG. 8 shows the detailed data frame format of the first embodiment.

In general, according to one embodiment, a wireless communication terminal including a receiver, a first processor, a first storage, a second storage, a second processor, and a transmitter is provided. The receiver receives one physical packet that includes at least one frame body field, a first field including information on a length of the frame body field, a second field used to detect an error of the frame body field, and a sequence number field including a sequence number corresponding to the frame body field. The first processor extracts the correct frame body field(s) using the first field(s) and the second field(s). The first storage retains the frame body field(s) extracted by the first processor and the sequence number field(s) corresponding to the frame body field(s). The second storage retains a successively and successfully received maximum sequence number on the basis of a result of the first processor. The second processor transfers the frame body fields corresponding to the sequence numbers up to the successively and successfully received maximum sequence number from the first storage to continued receiving process. The transmitter transmits a response frame indicating the successively and successfully received maximum sequence number when the first processor extracts at least one correct frame body.

Hereinafter, embodiments will be described with reference to the drawings.

A communication state of an electromagnetic wave having a millimeter waveband at wavelengths of the order of millimeters, for example, a 60-GHz band can be considered to be roughly divided into two cases, i.e., one case it is significantly good and in the other case it is significantly bad (IEEE 802.11 doc.: IEEE 802.11-09/0302r0). The following embodiments relate to improvement of communication efficiency mainly in an operation of frame reception where such communication state is expected.

First Embodiment

A frame used in wireless communication and a basic configuration of a wireless communication terminal will be described.

In a first embodiment, the wireless communication terminal is connected to another wireless communication terminal and uses three kinds of frames in conducting communication. A management frame is used to manage a physical communication link with another wireless communication terminal. Examples of the management frame include a frame used to start communication with another wireless communication terminal, a frame releasing the communication link (that is, terminating connection), and a frame relating to a power saving operation at the wireless communication terminal.

A data frame transmits data generated in the wireless communication terminal to another wireless communication terminal after the physical communication link with another wireless communication terminal is established. The data are generated by an upper layer of the first embodiment. For example, the data are generated by user operation.

A control frame is used to perform control when the data frame is transmitted to and received from (exchanged with) another wireless communication terminal. One of the control frames is a response frame that is transmitted to acknowledge transmission when the wireless communication terminal receives the data frame.

The three kinds of the frames are subjected to necessary processing in a physical layer (hereinafter referred to as a PHY layer) and transmitted as a physical packet through an antenna.

FIG. 1 illustrates a format of the data frame of the first embodiment. An aggregation frame, in which the plurality of data items are aggregated into one physical packet, is dealt with in the first embodiment. In FIG. 1, n data items are aggregated as a frame body. For the sake of convenience, a set of a subheader field (hereinafter referred to as an SH field) 2, a frame body field (hereinafter referred to as an FB field) 3, and a frame check sequence field (hereinafter referred to as an FCS field) 4 is collectively referred to as a "frame" and expressed as frame #1, frame #2, . . . , frame #n.

Items of information, such as a transmitter unique ID (hereinafter referred to as Tx UID) of the wireless communication terminal that transmits the frame and a receiver unique ID (hereinafter referred to as Rx UID) of the wireless communication terminal that receives the frame, which are common to the whole of the frame are set in a common header field (hereinafter referred to as a CH field) 5. The wireless communication terminal that receives the frame judges whether the frame is addressed to it using the Rx UID. Then the receiving process is performed according to the judgment. Therefore, preferably the Rx UID is located at the head of the CH field 5 followed by the Tx UID. Information on the number of FB fields 3 aggregated thereafter may be set in the CH field 5. An error detecting field, namely, a header check sequence field (hereinafter referred to as HCS field) 6 may be added to the CH field 5 to check whether the information in the CH field 5 is correctly received.

At least one data item is set after the CH field 5. Each data item is set in the FB field 3, and the SH field 2 and the FCS field 4 are associated with the FB field 3.

A length field 7 indicating an FB field length, a sequence number field (hereinafter referred to as an SN field) 8 indicating the sequence number, and the HCS field 6 are set in the SH field. Although the HCS field 6 is illustrated adjacent to the SH field 2 in FIG. 1, the HCS field 6 is included in the SH field 2. The SH field 2 may include information 9 indicating a frame type corresponding to the SH field and the FB field. Because the frame is the data frame, the frame type indicates that it is the data frame. For example, the information 9 indicating the frame type may be expressed by one field or a plurality of fields, for example, a first field discriminating the control frame from the data frame/management frame and a second field discriminating the data frame from the management frame. It is sufficient if the information on the frame type can finally be discriminated at a level of at least the data frame, the management frame, and the control frame. The information 9 indicating the frame type may be set in the CH header 5 instead. The HCS field 6 is the error detecting field used to judge whether the information in the SH field 2 is correctly received. Whether the data items in the SH field, such as the FB field length 7 and the sequence number 8, which are indicated by the SH field 2 can be correctly extracted can be determined by providing the HCS field 6 in the SH field 2.

The FCS field 4 subsequent to the FB field 3 is the error detecting field used to judge whether the information in the FB field 3 is correctly received.

FIG. 2 illustrates a format of an acknowledgement frame transmitted by the wireless communication terminal that receives the data frame in the first embodiment.

The CH header is similar to that in the data frame format. When there is a field which indicates the number of FB fields aggregated, the number is set to 0 (zero) for the acknowledgement frame.

Although the SH field of FIG. 2 has the same configuration as the SH field of FIG. 1, the SH field of FIG. 2 may have the configuration different from that of the SH field of FIG. 1. However, at least the SN field 2 indicating the sequence number and the HCS field 6 are set in the SH field. Although the HCS field 6 is illustrated adjacent to the SH field 2 in FIG. 2, as in FIG. 1, the HCS field 6 is included in the SH field 2. When the information 9 indicating the frame type is set in the SH field similarly to the data frame, it indicates that this frame is the control frame. The information 9 indicating the frame type may be set in the CH header 5 instead. As to a method for expressing the information 9 indicating the frame type, similarly to the data frame whose format is shown in FIG. 1, the information 9 may be expressed by one field or the plurality of fields, for example, the first field discriminating the control frame from the data frame/management frame and the second field discriminating the data frame from the management frame. The frame is the control frame, and the frame is independent of the second field discriminating the data frame from the management frame when the frame type is expressed by the plurality of fields as described above. Therefore, the second field becomes reserved. When the SH field 2 of the acknowledgement frame has the same configuration as the SH field 2 of the data frame in FIG. 1, the length field may be set to reserved or, for example, 0 (zero) may be set because the FB field does not exist.

In the acknowledgement frame of the first embodiment, the SN field 2 indicates the maximum sequence number among the frames that were successively and successfully received by the wireless communication terminal, i.e., the successive maximum sequence number (hereinafter referred to as an SMSN) 8'.

The HCS field 6 that is the error detecting field is provided at the end of the SH field 2 of the acknowledgement frame to judge whether the information in the SH field 2 is correctly received.

By such format of an acknowledgement frame, the response frame length can be shortened to improve the communication efficiency under the significantly good communication environment compared with the method of the related art which indicates acknowledgement to each of the plurality of frame bodies, namely, each data item. Also, only one receiving state may be retained as information input to the acknowledgement frame.

The frames including the data frame and the acknowledgement frame are subjected to coding process in a physical layer, a physical header and a preamble are provided to the frames, and the frames are transmitted from the antenna after modulation.

FIG. 3 illustrates the configuration of the wireless communication terminal of the first embodiment.

A reception processor 10 and a transmission processor 20 are connected to an upper layer processor 0, an access controller 30, and a PHY processor 40. The PHY processor 40 includes a receiver that receives the physical packet and a transmitter that transmits the physical packet, and the PHY processor 40 is connected to an antenna 60 through a frequency conversion circuit 50.

In the wireless communication terminal of the first embodiment, a configuration of a wireless communication device unit may include the antenna 60 of FIG. 3. By including the antenna 60 in the wireless communication device unit, one can configure a wireless communication device as one device including the antenna, so that a mounting area can be suppressed. Also, in FIG. 3, the antenna 60 is shared by the transmission processor 20 and the reception processor 10. When the one antenna is shared by the transmission processor and the reception processor, the wireless communication device can be miniaturized.

The transmitter of the PHY processor 40 performs processing such as coding to the frame received from the transmission processor 20 and converts the frame into a physical packet. The physical packet is modulated into a radio signal having a necessary frequency band, for example, a 60-GHz millimeter waveband by the frequency conversion circuit 50 and radiated from the antenna 60. Although the antenna 60 is shown to be consisting of a plurality of antennas in FIG. 3, it may be a single antenna.

In receiving a radio signal, the frequency conversion circuit 50 demodulates the radio signal received from the antenna 60 into a base band signal that can be processed by the PHY processor 40, and the frequency conversion circuit 50 transfers the demodulated radio signal to the receiver of the PHY processor 40. After the receiver performs physical packet decoding process and process of removing the preamble and the physical header, a payload portion is transferred as the frame from the PHY processor 40 to the reception processor 10. Before the frame transferred to the reception processor 10, an indication of starting to receive the physical packet is input to the reception processor 10. After the frame is transferred to the reception processor 10, an indication of ending the reception is input to the reception processor 10. An indication of detecting the error of the physical packet and information on a state of a wireless medium are input to the access controller 30.

The reception processor 10, the transmission processor 20, and the access controller 30 deal with the data frame, the control frame, and the management frame and establish a wireless link with another wireless communication terminal to exchange the frames. The reception processor 10, the transmission processor 20, and the access controller 30 perform processing relating to at least media access control (hereinafter referred to as MAC). As to the data frame, the reception processor 10, the transmission processor 20, and the access controller 30 perform process including process to sort the data items on the reception side such that the order of the data reception matches the order of the data transmission at a level of an application layer between the wireless communication terminals that exchange the data.

The plurality of different PHY processors and the transmission processor, the reception processor, and the access controller, which correspond to each of the PHY processors, may be provided, and a common processor across the different PHY processors may be further provided.

When transmission data are generated by user operation in the application layer for example, the data are transferred to the transmission processor 20 through the upper layer processor 0 and converted into data frames whose format is shown in FIG. 1 by the transmission processor 20. Each data item is handled as a frame body and is set in a single FB field, or is fragmented into smaller units and is set across multiple FB fields. An integer counter that increments a value by one is prepared in the transmission processor 20, and the value of the counter is allocated as the sequence number to the SN field corresponding to the frame body while the same type of the frame (in this case, data frame) is transmitted to the same wireless communication terminal. The transmission processor 20 measures transmission timing on the basis of the information from the access controller 30, and transfers the generated frame to the PHY processor 40 along with a transmission instruction. At this point, instructions of a modulation scheme and a coding scheme necessary to the transmission may simultaneously be issued.

In the wireless communication terminal that receives the data frame through the PHY processor 40, the reception processor 10 generates an acknowledgement frame whose format is shown FIG. 2 in response to the data frame and transmits the acknowledgement frame as the physical packet after waiting a predetermined interframe space (hereinafter referred to as IFS) from the end of the physical packet including the data frame. The reception processor 10 also sequentially transfers contents of the FB field in the received data frame to the upper layer processor 0 on the basis of the SN field.

In the first embodiment, when at least one FB field is correctly extracted from the received data frame, the acknowledgement frame in which the maximum sequence number among the frames that were successively and successfully received, i.e., SMSN, is set in the SN field is transmitted after the IFS of the data frame reception. When the SMSN is updated by the frame body that is newly correctly extracted from the received frame, the frame body is transferred to the upper layer processor 0. For this purpose, the reception processor 10 includes a deaggregation/filter unit 12, a receiving buffer 14, a successive maximum sequence number (SMSN) retention unit 16, and a reception coordinator 18. The reception processor 10 is not limited to the configuration shown in FIG. 3, but any configuration may be adopted as long as the purpose can finally be accomplished.

The deaggregation/filter unit 12 performs deaggregation process to separate and extract each FB field when the FB fields are aggregated, and the deaggregation/filter unit 12 also performs filtering process to filter only the frames necessary for the subsequent receiving process.

When the frame type information is in the CH field, preferably the process is performed as follows. When the information on the number of frame bodies is described in the CH field and when it is zero, whether the frame type permits the number of frame bodies to be zero is confirmed. Also, whether identifiers of the frame fall within a permissible range of Tx UID and a permissible range of Rx UID are confirmed as a condition in processing the frame type. When the condition is satisfied, the control frame is transferred to the reception coordinator 18, and the data frame is transferred to the receiving buffer 14. When the management frame is managed by the sequence number, the management frame is transferred to the receiving buffer 14 similarly to the data frame, and the transmission of the acknowledgement frame that is a response operation described later will be also similar to that of the data frame. When the information on the number of frame bodies is 1 or more, the frame type is confirmed, and whether the frame type permits the number of frame bodies is confirmed. Whether identifiers of the frame fall within the permissible range of Tx UID and the permissible range of Rx UID are confirmed as the condition in processing the frame type. The deaggregation process is performed when the condition is satisfied. When the received frame is out of the condition in the filtering process, the frame is subjected to error process or directly discarded according to the way the frame is out of the condition. Following the above procedure, the received frame is subjected to the deaggregation process in the case of the data frame addressed to the wireless communication terminal, and the received frame is transferred to the reception coordinator 18 in the case of the acknowledgement frame addressed to the wireless communication terminal. In the deaggregation process, the aggregated FB fields are individually extracted by the information in the length field of the SH field. Whether the information in the SH field has no error is determined on the basis of the HCS field set in the end of the SH field. When the information in the SH field is determined to have no error, namely, determined to be correct, the FB field is extracted using the information on the length field. Whether the information in each FB field has no error is determined on the basis of the FCS field subsequent to the FB field. The information in the FB field that is determined to have no error, namely, that is determined to be correct is transferred to the receiving buffer 14 along with the information on the corresponding SN field (sequence number). The items of information on the frame body, which are of the frame body length (length field) and the sequence number (SN field), are concentrated in one place, whereby the information used in the deaggregation/filter unit 12 and the receiving buffer 14 is easily extracted. When the information in the FB field is correctly extracted and that is the first one after start of the reception frame process, an instruction to start preparation of the acknowledgement frame is transferred to the reception coordinator 18. When at least one FB field is correctly extracted from the received frame by this indication to the reception coordinator 18, the reception coordinator 18 prepares the transmission of the acknowledgement frame in response to the instruction. After the extraction and the determination are made to the FB field to which the SH field is associated and the FCS field subsequent to the FB field, the SH field next to the FCS field is searched to continue the similar operation. When the process is completed up to the end of the received frame, an indication of ending the reception frame process is transferred to the reception coordinator 18. At this point, an actual time in which the reception frame process is ended is added to the indication. A time at which the indication of the end of the reception frame is received from the PHY processor 40 is recognized, and a processing delay generated until the recognition of the indication is subtracted from the time at which the indication of the end of the reception frame is received, thereby fixing the time at which the received frame is ended. When the number of actually extracted frame bodies differs from the information on the number of frame bodies, the received frame is subjected to the error process. The deaggregation process may be ended at a stage at which the number of extracted frame bodies becomes equal to the information on the number of frame bodies.

When the frame type information is set in the SH field, in the case of the frame addressed to the wireless communication terminal, the necessary information depending on the frame type is appropriately transferred to the reception coordinator 18 and the receiving buffer 14 while the deaggregation process by the SH field(s) is performed. When the information on the number of frame bodies is zero, whether the frame type permits the number of frame bodies of zero is confirmed using the next SH field. When the identifiers of the frame fall within the permissible range of Tx UID and the permissible range of Rx UID as the condition in processing the frame type, the frame is transferred to the reception coordinator 18. When the information on the number of frame bodies is 1 or more, whether the frame type permits the number of frame bodies is confirmed using the initial SH field immediately after the CH field. Whether the identifiers of the frame fall within the permissible range of Tx UID and the permissible range of Rx UID is confirmed as the condition in processing the frame type. The deaggregation process is performed when the condition is satisfied.

The deaggregation process is similarly performed. However, during the deaggregation process, the frame type information described in each SH field is confirmed to determine the permissible frame type and when the frame is out of the condition, the frame is subjected to the error process. For example, it is assumed that only the frame bodies of a single frame type can be aggregated in one frame. In such case, when a frame in which the frame bodies having different frame types are mixed, for example a frame with the initial SH field indicating the data frame and the next SH field indicating the management frame is received, the frame is subjected to the error process.

The information (frame body) in the FB field determined to be correct and the corresponding sequence number are retained in the receiving buffer 14 while paired with each other. Preferably the pairs of the frame bodies and the sequence numbers are reordered in the order of the sequence numbers. The receiving buffer 14 refers to the maximum sequence number retained by the SMSN retention unit 16. When there is a sequence number that is larger than the maximum sequence number by 1, the frame body corresponding to the sequence number larger than the maximum sequence number by 1 is transferred to the reception coordinator 18, and the SMSN retention unit 16 is notified of the sequence number larger than the maximum sequence number by 1. Preferably an area in which the frame body and the sequence number corresponding to the frame body are retained is cleared when the receiving buffer 14 transfers the frame body to the reception coordinator 18.

The SMSN retention unit 16 retains the sequence number of which the receiving buffer 14 notifies the SMSN retention unit. Therefore, the SMSN retention unit 16 retains the SMSN that is successfully received.

The reception coordinator 18 works with the transmission processor 20 or the upper layer processor 0 in response to the input from the deaggregation/filter unit 12. When receiving the indication of the start of the preparation of the acknowledgement frame, the reception coordinator 18 waits for the indication of the end of the reception frame process. When receiving the indication of the end of the reception frame process, the reception coordinator 18 obtains the SMSN from the SMSN retention unit 16 and issues an instruction to transmit the acknowledgement frame including the SMSN and the time at which the received frame ended to the transmission processor 20. When the error process is invoked due to the reception of the improper frame before the indication of the end of the reception frame process is received since the indication of the start of the preparation of the acknowledgement frame is received, preferably the start of the preparation of the acknowledgement frame is suspended. When the FB field is input to the reception coordinator 18 from the receiving buffer 14, the reception coordinator 18 transfers the FB field, namely, the frame body, to the upper layer processor 0. When the acknowledgement frame is input to the reception coordinator 18, the reception coordinator 18 transfers the information on the acknowledgement described in the frame to the transmission processor 20. In the first embodiment, because the notification of the successfully received SMSN is made by the acknowledgement frame, the transmission processor 20 is notified of the SMSN. Preferably the transmission processor 20 is simultaneously notified of the Tx UID of the acknowledgement frame, namely, the identifier of the wireless communication terminal that transmitted the acknowledgement frame.

When receiving the instruction to transmit the acknowledgement frame, the transmission processor 20 generates the acknowledgement frame whose format is shown in FIG. 2 in which the SMSN is set in the SN field, and transfers the acknowledgement frame to the PHY processor 40 such that the acknowledgement frame is transmitted after a fixed time elapses since the indicated time at which the received frame ended. The fixed time preferably is the defined minimum IFS and is the total of the time required when switching between transmission and reception and the processing delay cost to recognize that the reception frame requires acknowledgement and generate and transmit the acknowledgement frame. Generally the minimum IFS is called a short interframe space (hereinafter referred to as an SIFS). When the information on the acknowledgement is received from the reception coordinator 18, process to retransmit appropriate frames is performed using the information. In the first embodiment, when the indication of the SMSN is received, the frame bodies whose sequence numbers are larger than the indicated sequence number are retransmitted. The sequence of generating and transmitting the data frame including the retransmitted frame bodies is similar to the sequence described above. By simultaneously receiving the Tx UID of the acknowledgement frame and the SMSN, the determination that the retransmission process should be performed to the frame bodies having the Rx UID same with the Tx UID can be made. That is, when the acknowledgement frame is received from the wireless communication terminal to which the data frame is transmitted, the retransmission can properly be performed to the wireless communication terminal. The process of retransmitting all the frame bodies included in the frame when an acknowledgement frame is not received within a predetermined time after the transmission of the frame (data frame or management frame) which is the subject of retransmission process is similar to the well-known technique.

The sequence numbers are used to make the data sequences of the wireless communication terminal on the data transmission side and the wireless communication terminal on the data reception side identical as common recognition. In the first embodiment, on the basis of the information in the SN field, the received frame body information can be passed to the upper layer through the reception coordinator 18 by the above operation of the receiving buffer 14 while correlated with the sequence in the wireless communication terminal on the data transmission side. The frame body information may directly be transferred from the receiving buffer 14 to the upper layer processor 0 without reordering.

When receiving the frame body information of the received frame from the reception processor 10, the upper layer processor 0 performs continued receiving process such that the frame body is input as the data to the application. The frame body information is transferred from the reception processor 10 to the continued receiving process.

Therefore, frame exchange for data on the basis of the acknowledgement can be accomplished between the wireless communication terminals.

The case of receiving data frame shown as FIG. 4 will specifically be studied hereinafter. It is assumed that the CH field is correctly received. That is, it is assumed that the CH field includes the HCS field, and it is assumed that the error is not detected by the HCS field. When the CH field is not correctly received, the acknowledgement frame is not transmitted. The HCS field in each SH field and the FCS field associated with each FB field are omitted. However, a mark "◦" is indicated below the SH field or the FB field when the SH field or the FB field is determined to be not erroneous by the HCS field or the FCS field (that is, the SH field or the FB field is correct), and a mark "x" is indicated below the SH field or the FB field when the error is detected by the HCS field or the FCS field. For the sake of convenience, the SH field and the FB field of the first frame set are expressed by SH1 and FB1, the SH field and the FB field of the second frame set are expressed by SH2 and FB2, the SH field and the FB field of the third frame set are expressed by SH3 and FB3, and the SH field and the FB field of the fourth frame set are expressed by SH4 and FB4. In FIG. 4, the data frame includes four frame sets, where the SH fields and the FB fields of the first, second, and third frame sets are correctly received, but for the fourth frame set, the error is detected in the SH field and therefore the FB field is determined to be erroneous (when SH4 is determined to be erroneous by the corresponding HCS field, the operation to determine FB4 using the corresponding FCS field may be omitted). When the sequence numbers 101, 102, 103, and 104 are allocated to the SN fields of SH1, SH2, SH3, and SH4, respectively, because the maximum sequence number that is successively and successfully received in the wireless communication terminal is 103, the acknowledgement frame in which 103 is set in the SN field is transmitted to the wireless communication terminal that transmitted the data frame. When receiving the acknowledgement frame in which 103 is set in the SN field, the wireless communication terminal that transmitted the data frame recognizes it is necessary to retransmit the data corresponding to the sequence number 104, and the wireless communication terminal transmits a data frame including the frame set which was previously SH4 and FB4.

Again, a data frame having the same sequence numbers with the data frame of FIG. 4 is considered. For example, as illustrated in FIG. 5, when FB3 is determined to be erroneous on the basis of the corresponding FCS field while SH3 of the third frame set is determined to be correct on the basis of the HCS field, the acknowledgement frame in which 102 is set in the SN field is transmitted to the wireless communication terminal that transmitted the data frame. When receiving the acknowledgement frame in which 102 is set in the SN field, the wireless communication terminal that transmitted the data frame recognizes it is necessary to retransmit the data items from the sequence number 103, and the wireless communication terminal retransmits the frame set of SH3 and FB3 and the frame set of SH4 and FB4. The frame set of SH3 and FB3 and the frame set of SH4 and FB4 may be aggregated in one data frame, or the frame set of SH3 and FB3 and the frame set of SH4 and FB4 may individually be transmitted as a data frame in which the CH field is added to the head of each of the frame sets. The data frame may be configured by also adding the frame sets that are not yet transmitted to the retransmitted frame sets.

The case of a data frame whose reception status is shown as FIG. 6 will be considered. When the sequence numbers are allocated the same with the data frame of FIG. 4, the frame sets corresponding to the sequence numbers 101, 102, and 103 are unsuccessfully received while only the frame set corresponding to the sequence number 104 is successfully received. In the case of the receiving result of FIG. 6, the wireless communication terminal generates and transmits the acknowledgement frame because the fourth frame set can be correctly extracted, but the maximum sequence number that is successively and successfully received is not updated by the reception of the data frame. If the data frames up to the sequence number 100 are successfully received before the reception of the data frame of FIG. 6, the sequence number 100 is retained as the successively and successfully received maximum sequence number. In such case, the acknowledgement frame in which the sequence number 100 is set is transmitted in response to the data frame of FIG. 6. The wireless communication terminal that transmitted the data frame recognizes it is necessary to retransmit the data items from the sequence number 101. And further by the fact that the acknowledgement is received from the wireless communication terminal of the destination, the wireless communication terminal can recognize that some of the data items successfully reached the wireless communication terminal of the destination, namely, the connection state is maintained, and that the wireless communication terminal of the destination is currently in a receivable state even if the wireless communication terminal of the destination performs a power-saving operation. This serves as a substitute for transmitting a probe frame to confirm the connection with the other wireless communication terminal of the communication pair or confirm whether the other wireless communication terminal of the communication pair is in a receivable state even if the other wireless communication terminal performs a power-saving operation.

The case of a data frame whose reception status is shown as FIG. 7 will be considered. When the sequence numbers are allocated the same with the data frame of FIG. 4, the frame sets corresponding to the sequence numbers 101, 102, and 103 are unsuccessfully received, and the error is detected in FB4 of the frame set corresponding to the sequence number 104. In the case of the receiving result of FIG. 7, because the wireless communication terminal can not extract any correct frame body, namely, any data item, the wireless communication terminal does not generate and transmit the acknowledgement frame. Because the wireless communication terminal that transmitted the data frame does not receive the acknowledgement frame from the wireless communication terminal of the destination after the fixed time elapses since the data frame is transmitted, the wireless communication terminal that transmitted the data frame determines that the data did not reach the wireless communication terminal of the destination, and retransmits the data items which were waiting for the acknowledgement frame and were retransmission candidates, namely, the frame sets corresponding to the sequence numbers 101 to 104.

When not receiving the acknowledgement frame, the wireless communication terminal on the data transmission side determines that the wireless communication terminal of the destination fails to receive all the frame sets in the transmitted data frame and performs the retransmitting process. When having a mechanism to transmit a frame (that is preferably the control frame) requesting the acknowledgement frame, the wireless communication terminal on the data transmission side may transmit the request frame. The data-reception-side wireless communication terminal that receives the request frame transmits an acknowledgement frame with the value retained by the SMSN retention unit 16 set in the acknowledgement frame.

In the cases of FIGS. 6 and 7, because SH fields in the first half are erroneous, the FB fields and the FCS fields cannot be extracted, and it is unclear where the next SH field starts. Therefore, when the SH field is determined to be erroneous by the HCS field, an operation to search the next SH field is performed. The operation is performed by the deaggregation/filter unit 12 of FIG. 3.

The SH field, the HCS field of the SH field, and the FCS field after the FB field are required to have fixed lengths. Preferably the length of the SH field is in a unit of bytes and a padding field (hereinafter referred to as a PAD field) is appended after the FB field such that the sum of the lengths from the FB field to the FCS field becomes an integral multiple of the length of the SH field. At this point, it is assumed that the SH field has the length of 8 bytes, and it is assumed that the HCS field included in the SH field has the length of 4 bytes. It is also assumed that the FCS field has the length of 4 bytes. Then the PAD field becomes 0 to 7 bytes. Desirably each bit in the PAD field is set to 0. The format of such data frame is shown in FIG. 8. As the length field in the SH field does not include the length of the PAD field, the wireless communication terminal on the data reception side can extract only the FB field using the value of the length field. It can be determined that the FCS field is located in an area of 4 bytes returning from a point of the minimum integral multiple of the length of 8 bytes of the SH field larger than the FB field counted up from the head of the FB field. The operation will be described with reference to FIG. 9. For example, when the length field indicates 18, 18 bytes after the SH field are extracted as the FB field, a point that is 24 byte away from the base point immediately after the SH field is set to an ending point of the FCS field because the minimum integral multiple of 8 no less than 18 is 24, and the area of 4 bytes returning from the ending point of the FCS field can be extracted as the FCS field. It is noted that an FCS field targets error detection only on an FB field and the PAD field is not included in the target of the error detection.

In the case of the configuration including aggregated frame sets, assuming that only the same frame type is permitted, the configuration of the control frame, such as the acknowledgement frame, which has only up to the SH field and does not have the FB field, the subsequent PAD field, nor the FCS field as shown in FIG. 2, is not included. At least the minimum length of the frame body, the PAD field, and the FCS field having the length of 4 bytes are inevitably located subsequent to the HCS field determined to be erroneous, and followed by the next SH field. Because the sum of the minimum length of the frame body, the length of the PAD field, and the length of 4 bytes of the FCS field is the integral multiple of the length of an SH field, the search starting point of the next SH field may be shifted by the integral multiple of the length of the SH field from a base point immediately after the current SH field. This will be described with reference to FIG. 10. For example, when 0 byte is permitted as the minimum length of the frame body, because the sum of the minimum length of the frame body, the length of the PAD field, and the length of 4 bytes of the FCS field is the integral multiple of the length of the SH field, the PAD field is 4 bytes, and the point ((c) of FIG. 10) that is shifted by 8 bytes which is the length of the SH field from the base point immediately after the current SH field ((b) of FIG. 10), namely, the point ((c) of FIG. 10) that is shifted by 16 bytes from the head of the current SH field ((a) of FIG. 10) is set to the search starting point of the next SH field. The fixed length of 8 bytes of the SH field from the search starting point of the next SH field is extracted as the SH field, and the error detecting is performed while the last 4 bytes of the extracted SH field is assumed to be the HCS field.

When the error is found by the error detection using the portion assumed to be the HCS field, the point that is shifted by the fixed length of 8 bytes of the SH field from the current search starting point of the SH field ((c) of FIG. 10) is set to the search starting point of the SH field ((d) of FIG. 10), the fixed length of 8 bytes of the SH field is extracted as the SH field again, and the error detecting is performed while the last 4 bytes is assumed to be the HCS field. When the error is found again by the error detection using the portion assumed to be the HCS field, the same process is repeated, namely the point that is shifted by the fixed length of 8 bytes of the SH field from the current search starting point of the SH field is set to the search starting point of the SH field, the length of the SH field is extracted as the SH field, and the error detecting is performed on the assumed HCS field.

When the error is not found by the error detection using the portion assumed to be the HCS field, the area that is extracted by the fixed length of 8 bytes of the SH field is fixed as the SH field, and the FB field and the FCS field associated with the FB field are extracted. The process to recognize and remove the PAD field is described above.

Therefore, the SH field can be detected even if it is unclear where the next SH field starts.

In the above process of searching the SH field, when the length of the area remaining from the base point immediately after the current SH field is less than the sum of the length of the SH field and twice the sum of the minimum length of the frame body, the length of the FCS field, and the length of the PAD field in the case of the minimum length of the frame body, it can be determined that the next frame set does not exist, and the search process may be ended. As illustrated in FIG. 8, when the length of the FCS field is shorter than the length of the SH field while the minimum length of the frame body is set to zero, the sum of the length of the FCS field, the minimum length of the frame body, the length of the FCS field, and the length of the PAD field is 8 bytes and equal to the length of the SH field. Therefore, the search process is ended when the area where the process of extracting the frame bodies is not yet performed is less than 24 bytes in which the length of 8 bytes of the SH field is added to 16 bytes that is twice the sum, namely, three times the length of the SH field. On the other hand, when the area where the process of extracting the frame bodies is not yet performed is more than three times the length of the SH field, because there is still possibility that frame sets exist, the process of searching the next SH field is performed. When the above discussion is replaced with the discussion of the length of the area remaining from the current search starting point of an SH field, because the length of the SH field currently assumed exists in addition to three times the length of the SH field, the question is asked whether the length of the area remaining from the current search starting point of the SH field is less than four times the length of the SH field.

In the above description, the configuration unit such as the acknowledgement frame in which the frame set is completed by the SH field as shown in FIG. 2, is not permitted to be mixed. However, when such configuration unit is permitted to be mixed, the minimum length of the frame body and the length of the FCS field are set to 0 byte (that is, it is assumed that the frame body and the FCS field do not exist) and the search process is performed while the search starting point of the next SH field is set to the point ((b) of FIG. 10) that is shifted by the fixed length of the SH field from the current search starting point of the SH field from the beginning (when the error is detected at the point (b) of FIG. 10, the search process is performed while the point (c) of FIG. 10 is set to the search starting point. The same process will be performed thereafter).

Assuming that the data frame has the format of FIG. 8, a concrete operation to search the SH field in the case of FIG. 6 is described as follows. It is assumed that the minimum length of a frame body is 0. When the initial SH field is determined to be erroneous by the HCS field thereof, the point shifted by 8 bytes from the base point immediately after the SH field is assumed to be the next search starting point of the SH field and the error detection is performed by the newly assumed HCS field portion. In this case, because the SH field is determined to be erroneous, the search starting point of the SH field is further shifted by 8 bytes, and the same process is performed. When the final SH field (designated by SH4) is extracted and determined to be correct by the HCS field, the FB field is extracted using the length field, the point that is not less than the length field and is the minimum integral multiple of 8 bytes is determined to be the end of the frame set, and the area of 4 bytes returning from the end of the frame set is extracted as the FCS field. The FB field is determined to be correct by the FCS field.

The method in which the length of the area where the process of extracting the frame bodies is not yet performed is used is described above as the determination whether the process of searching the SH field is continued. When the number of aggregated frames is indicated in the CH field, the number of aggregated frames may be used to determine whether the process of searching the SH field is continued. The method in which the number of aggregated frames is used may be combined with the method in which the length of the area where the process of extracting the frame bodies is not yet performed is used. When the SH field is determined to be correct by the HCS field thereof, 1 is counted as the number of frames, and the area where the SH field search fails is counted as 1. When the count value becomes equal to the number of aggregated frames, the process of searching the next SH field is ended. In FIG. 6, assuming that the number of aggregated frames of 4 is indicated in the CH field, because the SH field determined to be correct by the HCS field does not exist in the frame sets #1 to #3, only 1 can be counted as the number of frames, the process of searching the SH field is continued, and the SH field is determined to be correct by the HCS field in the final frame set #4. The count value of the number of frames is 2 even in the final stage. In FIG. 5, the count value of the number of frames is 3 at the frame set #3, and the SH field is searched immediately after the frame set #3 on the basis of the relationship between the value of the length field of the SH3 field and the integral multiple of 8 bytes. However, because the SH4 field is determined to be erroneous at that time, the count value becomes 4, and the SH field is not further searched.

When there is no restriction to the integral multiple of the length of the SH field, assuming that the frame set is always configured in units of byte lengths, the portion in which the length of the SH field is used in the above operation to search the SH field is substituted with 1 byte.

Second Embodiment

A second embodiment is based on the first embodiment. In the configuration of the first embodiment, the second embodiment has a configuration in which the wireless communication terminal on the data transmission side indicates to the wireless communication terminal on the data reception side from which sequence number the transmission of the data frame is started.

Specifically, for example, a bit indicating the start of the sequence number is provided in the SH field. When the wireless communication terminal on the data transmission side transmits the data frame, the bit in the SH field of a frame set where the initial sequence number is held is set (that is, the bit is set to 1). In other frame sets, the bit is not set (that is, the bit is set to 0). Therefore, the wireless communication terminal on the data reception side can obtain the starting number in recognizing the successively and successfully received maximum sequence number at the same time as the data are received, whereby it is not necessary for the wireless communication terminal on the data reception side to receive the indication of the sequence starting number from the wireless communication terminal on the data transmission side prior to the data exchange. That is, the data exchange can instantaneously be performed to improve the communication efficiency. The wireless communication terminal on the data reception side sets the sequence starting number to the value of the SN field of the SH field to which the bit is set, and sorts the received data items such that their sequence number are in successively increasing order from the sequence starting number. Specifically, the receiving buffer 14 of FIG. 3 transfers the data items whose sequence numbers are successive starting from the data item with the sequence starting number to the reception coordinator 18 and also notifies the SMSN retention unit 16 of the maximum sequence number that is successively and successfully received from the sequence starting number. When receiving indication of the sequence starting number, the SMSN retention unit 16 overwrites the retaining value by an initial value of (sequence starting number−1), and then the SMSN retention unit 16 overwrites the initial value by the maximum sequence number that is successively and successfully received. The initial value may be received from the deaggregation/filter unit 12 through the reception coordinator 18.

When transmitting an acknowledgement frame in response to the frame having the bit indicating the start of the sequence number set in the SH field, by setting the bit (indicated by "recognition of sequence start (SYNC)" in FIG. 11) also in the SH field of the acknowledgement frame, as illustrated in FIG. 11, the wireless communication terminal on the data transmission side can confirm whether the wireless communication terminal on the data reception side received the notification of the start of the sequence number accurately by receiving the acknowledgement frame. Therefore, the wireless communication terminal on the data transmission side recognizes that the wireless communication terminal on the data reception side correctly receives the frame sets starting from the notified sequence starting number to the successively and successfully received maximum sequence number of which the wireless communication terminal on the data reception side notifies the wireless communication terminal on the transmission side, and the data transmission including the data retransmission can be scheduled properly.

This will be described with reference to FIGS. 12 to 14. FIG. 12 illustrates the situation where the wireless communication terminal on the data transmission side transmits a data frame (designated by DATA) containing four frame sets and the wireless communication terminal on the data reception side transmits an acknowledgement frame (designated by ACK) in response to the data frame DATA. While the frame format is omitted, the state of the bit (designated by SYNC) indicating the start of the sequence number in each frame set and the value of the sequence number (designated by SN) can be seen in the data frame, and the value of the bit (designated by SYNC) indicating the recognition of the indication of the start of the sequence number and the value of the maximum sequence number (designated by SN) that is successively and successfully received can be seen in the acknowledgement frame. Similarly to the examples of the first embodiment, the reception status of each frame set or the acknowledgement frame is indicated by the marks "○" and "x". In FIG. 12, in order to indicate that the sequence number is started from the sequence number 101, the bit indicating the start of the sequence number is set in the initial frame set (SYNC=1 and SN=101). The bit indicating the start of the sequence number is not set in the subsequent frame sets because their sequence numbers are not the starting number (SYNC=0). The wireless communication terminal that receives the data frame correctly receives both the SH field and the FB field of the frame set (SYNC=1 and SN=101) in which the wireless communication terminal is notified of the start of the sequence, correctly receives both the SH field and the FB field of the second frame set (SYNC=0 and SN=102), detects error in the SH field or the FB field of the third frame set (SYNC=0 and SN=103), and correctly receives both the SH field and the FB field of the fourth frame set (SYNC=0 and SN=104). The wireless communication terminal on the data reception side transmits the acknowledgement frame (SYNC=1 and SN=102) that confirms recognition of the notification of the start of the sequence number and the successively and successfully received maximum sequence number to the wireless communication terminal on the data transmission side after the fixed time. When receiving the acknowledgement frame, the wireless communication terminal on the data transmission side performs the transmission from the frame which has the sequence number larger than the successively and successfully received maximum sequence number by 1. In FIG. 13, the frame sets of the sequence number 103 (SYNC=0 and SN=103) and the sequence number 104 (SYNC=0 and SN=104) are transmitted while aggregated. Although the frame sets are transmitted while aggregated in FIG. 13, the frame sets under retransmission may be transmitted separately. However, when the frame sets under retransmission are separately transmitted, it is necessary to transmit the frames in the order of the sequence numbers. Although only the frame sets of the retransmission targets are aggregated in FIG. 13, a new frame set of the sequence number 105 that is not yet transmitted may be aggregated. The plurality of new frame sets may be aggregated while added to the frame sets of the retransmission targets as long as the new frame sets have the successive sequence numbers from the sequence numbers of the frame sets of the retransmission targets. For example, the frame sets having the sequence numbers 105 and 106 may be aggregated to the data frame of FIG. 13.

The case in which the frame set indicating the start of the sequence number is unsuccessfully received, as illustrated in FIG. 14, will be discussed below.

When the wireless communication terminal on the data reception side fails to receive the FB field while successfully receiving the SH field, the wireless communication terminal on the data reception side may transmit an acknowledgement frame having SYNC=1 and SN=100 because the wireless communication terminal on the data reception side recognizes the sequence starting number 101. That is, the value of (sequence starting number−1) (that is, initial value of the previous SMSN retention unit 16) is returned when the FB field corresponding to the sequence starting number is unsuccessfully received.

When failing to receive the SH field of the initial frame set, the wireless communication terminal on the data reception side does not recognize the sequence starting number. However, the wireless communication terminal on the data reception side receives the second frame set (SN=102) and the fourth frame set (SN=104). Because the condition to transmit the acknowledgement frame is satisfied, the wireless communication terminal on the data reception side may transmit the acknowledgement frame while the value retained by the SMSN retention unit 16 is set in the acknowledgement frame. However, in this case, the wireless communication terminal on the data reception side does not recognize that the wireless communication terminal on the data reception side receives the frame set indicating the start of the sequence number, so the bit indicating that the wireless communication terminal on the data reception side recognizes the notification of the start of the sequence number is not set in the acknowledgement frame (SYNC=0). Therefore, the wireless communication terminal on the data transmission side recognizes that the wireless communication terminal on the data reception side does not receive the notification of the start of the sequence number, ignores the sequence number indicated in the acknowledgement frame, and performs retransmission from the frame set corresponding to the sequence starting number with the notification of the sequence starting number accompanied. Alternatively, when not recognizing the sequence starting number, the wireless communication terminal on the data reception side does not return the value retained by the SMSN retention unit 16, but return an arbitrary value. Even in this case, because the bit indicating that the notification of the start of the sequence is recognized is not set (SYNC=0) in the acknowledgement frame, similarly the wireless communication terminal on the data transmission side recognizes that the wireless communication terminal on the data reception side does not receive the notification of the start of the sequence number, ignores the sequence number indicated in the acknowledgement frame, and performs retransmission from the frame set corresponding to the sequence starting number with the notification of the sequence starting number accompanied.

Alternatively, when the indication of the sequence starting number is required to be in the initial data frame after the connection is established, the wireless communication terminal on the data reception side may not respond to the data frame when that condition is not satisfied. The wireless communication terminal on the data reception side may perform the error process in the case of no response. After transmitting the data frame, the wireless communication terminal on the data transmission side observes whether the acknowledgement frame comes during the fixed time, and the wireless communication terminal on the data transmission side can perform the retransmission process when determining that the acknowledgement frame does not come.

Therefore, a load on the wireless communication terminal on the data transmission side can be reduced without receiving the notification of the sequence starting number in every physical packet but by receiving the notification at the beginning of the data exchange.

Third Embodiment

A third embodiment is based on the first embodiment. In the configuration of the first embodiment, the third embodiment has a configuration in which the process of searching the SH field is ended when a certain condition is satisfied even if the area where extraction of frame bodies is not yet performed remains. The condition will be described in detail below. The information retained in the receiving buffer 14 of FIG. 3 is discarded at the time when the search is ended.

In the first embodiment, the process of searching the next SH field is performed when the error is detected in the SH field. In the first embodiment, the SH field is searched when the remaining area is no less than the sum of the length of the SH field and twice the sum of the minimum length of the FB field and the length of the FCS field.

At this point, the condition to transmit the acknowledgement frame is that at least one correct FB field is extracted. The notification of the successively and successfully received sequence number is made in the acknowledgement frame. When the frame sets are required to be always set in the data frame such that their sequence numbers are in successively increasing order, when the one or plurality of frame sets are unsuccessfully received in the first half of the data frame, there is no possibility of updating the already-retained successively and successfully received sequence number with the received data frame. In this case, it is only necessary to acknowledge whether the condition to transmit the acknowledgement frame is satisfied.

Because there is no possibility of updating the already-retained successively and successfully received sequence number with the received data frame, it is not necessary that the receiving buffer perform the operation to successively transfer the frame bodies to the next process in the order of the sequence numbers, and it is not necessary to retain the received data frame in the receiving buffer.

Therefore, it is assumed that the case in which a frame set is unsuccessfully extracted after at least one frame set is correctly extracted is the condition to end the search of the SH field, namely, the condition to end the process to extract the frame set. More particularly, it is assumed that a first condition is that a certain SH field is correctly extracted and the FB field extracted using the SH field is determined to be not erroneous (that is, correct) by the FCS field associated with the FB field, and it is assumed that a second condition is the case in which, in addition to satisfying the first condition, the SH field extracted from the area where extraction of frame bodies is not yet performed is determined to be erroneous by the HCS field associated with the SH field or the case in which, in addition to satisfying the first condition, the FB field extracted on the basis of the SH field determined to be not erroneous (that is, correct) is determined to be erroneous by the FCS field associated with the FB field. The process of searching the SH field is not performed when the second condition is satisfied.

The information on the frame set retained in the receiving buffer is discarded when the ending condition is satisfied.

The process of searching the SH field and the discard of contents of the receiving buffer will be described with reference to FIGS. 15 to 17.

Figure 15:
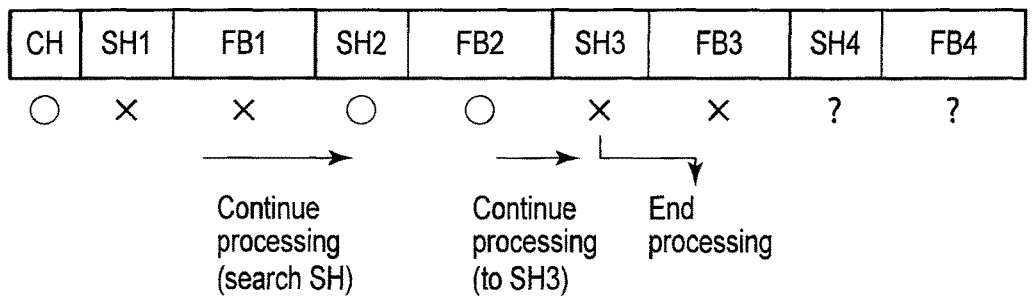
FIG. 15 explains processing within a received data frame according to a third embodiment.

In FIG. 15, after the CH field is correctly detected, the error is detected in the SH field (SH1) of the initial frame set by the HCS field thereof. Although the subsequent FB field (FB1) is determined to be erroneous, the process is continuously performed to the remaining area. That is, the process of searching the next correct SH field is performed subsequent to the SH1 field by the method based on the first embodiment. The SH field designated by SH2 in FIG. 15 is correctly extracted, and FB field FB2 indicated by SH field SH2 is determined to be correct (not erroneous) by the associated FCS field. At this point, the first condition is satisfied, the sequence number in SH field SH2 and FB field FB2 are transferred from the deaggregation/filter unit 12 of FIG. 3 to the receiving buffer 14, and the process is continuously performed to the remaining area. That is, SH field SH3 subsequent to the FCS field associated with FB field FB2 is extracted, and whether the error is not detected in SH field SH3 is determined using the HCS field of SH field SH3. FIG. 15 illustrates the case in which SH field SH3 is determined to be erroneous, and therefore the second condition is satisfied. Because the second condition is satisfied after the first condition is satisfied, the process after the extraction and determination of SH field SH3 is not performed. That is, although the unprocessed area remains, the process of searching the SH field is not continued but ended unlike in the first embodiment. The items of information on FB field FB2 and the sequence number corresponding to FB field FB2, which are retained in the receiving buffer 14 of FIG. 3, are discarded.

Figure 16:
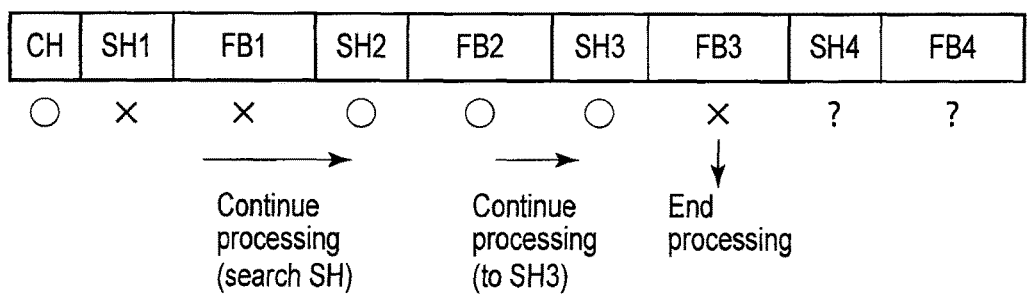
FIG. 16 explains another processing within the received data frame of the third embodiment.

FIG. 16 illustrates the case in which, although the first condition is satisfied similarly to the case of FIG. 15 until the process of extracting SH field SH3, extracted SH field SH3 is determined to be not erroneous (correct) by the HCS field thereof. However, FB field FB3 indicated by SH field SH3 is determined to be erroneous by the associated FCS field, and the second condition is satisfied at this point. Because the second condition is satisfied after the first condition is satisfied, the process after the extraction and determination of FB field FB3 is not performed. That is, although the unprocessed area remains, the process of searching the SH field is not continued but ended unlike in the first embodiment. The items of information on FB field FB2 and the sequence number corresponding to FB field FB2, which are retained in the receiving buffer, are discarded.

Figure 17:
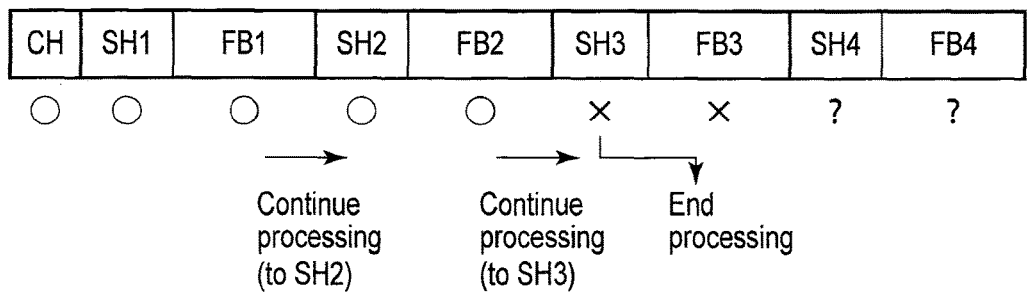
FIG. 17 explains still another processing within the received data frame of the third embodiment.

FIG. 17 illustrates the case in which the first half of the frame set can be correctly extracted. Because initial FB field FB1 can be correctly extracted, the first condition is satisfied, and the process to extract and determine the second SH field SH2 is continued. At this point, the sequence number in SH field SH1 and FB field FB1 are transferred from the deaggregation/filter unit 12 of FIG. 3 to the receiving buffer 14. The receiving buffer 14 refers to the SMSN retention unit 16 to compare the sequence number of SH field SH1 and the successively and successfully received maximum sequence number, which is retained by the data frame received before the received data frame. When determining that the sequence number of SH field SH1 is larger than the SMSN by 1, the receiving buffer 14 transfers the information on FB field FB1 to the upper layer processor 0 through the reception coordinator 18. SH field SH2 is determined to be correct, FB field FB2 is extracted on the basis of correct SH field SH2, FB field FB2 is also determined to be correct by the associated FCS field, and the process to extract and determine the SH field subsequent to the FCS field is continued. At this point, the sequence number in SH field SH2 and FB field FB2 are also transferred from the deaggregation/filter unit 12 of FIG. 3 to the receiving buffer 14. Because the sequence number of FB field FB2 is larger than that of FB field FB1, the receiving buffer 14 also transfers the information on FB field FB2 to the upper layer processor 0 through the reception coordinator 18. Then, because SH field SH3 is determined to be erroneous, the second condition is satisfied. Because the second condition is satisfied after the first condition is satisfied, the process after the extraction and determination of SH field SH3 is not performed. That is, although the unprocessed area remains, the process of searching the SH field is not continued but ended unlike in the first embodiment. In this case, because the frame bodies from FB field FB2 and the items of information on the sequence numbers associated therewith are not transferred to the receiving buffer 14, it is not necessary to dare to perform the discard process.

In the process of the third embodiment, the frame body and the sequence number associated therewith are tentatively transferred from the deaggregation/filter unit to the receiving buffer, and the information in the receiving buffer is discarded upon the determination that the process is ended. Alternatively, because the information retained by the SMSN retention unit is not updated in the received data frame when the first frame set of the received data frame cannot be correctly extracted, the items of information on the frame bodies of the subsequent frame sets and the sequence numbers associated therewith may be configured so as not to be transferred to the receiving buffer. When the frame sets are required to be always set in the data frame such that their sequence numbers are in successively increasing order, from the time when the extraction of the correct initial FB field fails or the time when the extraction of the correct FB field fails after the FB fields are successively and correctly extracted starting from the initial FB field, even if the extraction of frame sets is not completed up to the final portion of the received data frame, the items of information on the frame bodies of the subsequent frame sets and the sequence numbers associated therewith are not transferred to the receiving buffer, or the retention of the information is stopped in the receiving buffer.

Therefore, the receiving buffer 14 does not retain redundant items of information except the SMSN set in the acknowledgement frame and the information necessary for the SMSN retention unit 16, so that the use of the memory can be reduced on the data reception side compared with the method for responding to the plurality of data items of the related art. The buffer management can be facilitated to reduce implementation loads. The reduction of the implementation load leads to decreasing a risk of generating bugs in implementation.

The case in which the frame sets are required to be always set in the data frame such that their sequence numbers are in successively increasing order is described above. Alternatively, even if the sequence numbers are randomly set, the process may be ended under the above-described conditions. At this point, the SMSN cannot always be updated, although the SMSN could be updated unless the process is ended. However, because the condition to transmit the acknowledgement frame is satisfied, the wireless communication terminal on the data reception side can notify the wireless communication terminal on the data transmission side that at least one correct frame set is received.

Therefore, the redundant process of searching the SH field can be stopped after the condition to transmit the acknowledgement frame is satisfied, and power consumption can be reduced.

Fourth Embodiment

A fourth embodiment is based on the third embodiment. The fourth embodiment relates to a condition to end the process even if the unprocessed area sufficiently remains. In the fourth embodiment, it is not always necessary that the frame sets be set in the data frame such that their sequence numbers are in successively increasing order, but the processing is ended after the SMSN is updated at least once. Specifically, the first condition of the third embodiment is changed.

It is assumed that the first condition is that a certain FB field is determined to be not erroneous (correct) by the FCS field associated therewith and the SN field in the SH field corresponding to the FB field updates the successively and successfully received maximum sequence number retained in the SMSN retention unit 16 of FIG. 3. The process of searching the SH field is continued until the successively and successfully received maximum sequence number is updated on the basis of the received data frame. After the SMSN is updated at least once, the next process of searching the SH field is ended, even if the unprocessed area remains when the SH field is determined to be erroneous or when the FB field corresponding to the SH field is determined to be erroneous while the SH field is determined to be correct. The time when the receiving buffer performs the discard process is when the second condition is satisfied after the first condition is satisfied.

For example, it is assumed that the second frame set is successfully received as illustrated in FIG. 15 and the sequence number thereof updates the successively and successfully received maximum sequence number retained by the SMSN retention unit 16. At this point, the first condition is satisfied, and the subsequent process is ended at the time when SH field SH3 is determined to be erroneous similarly to the third embodiment. When receiving FB field FB2 from the deaggregation/filter unit 12 of FIG. 3, the receiving buffer 14 refers to the value retained by the SMSN retention unit 16. Because the sequence number corresponding to FB field FB2 is larger than the value by 1, the receiving buffer 14 transfers FB field FB2 to the upper layer processor 0 through the reception coordinator 18. Then, as the process is ended with respect to the received data frame in the deaggregation/filter unit 12, the receiving buffer 14 becomes empty because the items of information on the FB field and the SN field are not transferred to the receiving buffer 14.

For example, although the second frame set is successfully received as illustrated in FIG. 15, the successively and successfully received maximum sequence number retained in the SMSN retention unit 16 is not updated by the sequence number of the second frame set. At this point, because the first condition is not satisfied, unlike in the third embodiment, the process of searching the subsequent SH field is continued even if SH field SH3 is determined to be erroneous.

Although the first and second frame sets are correctly received as illustrated in FIG. 17, when, for example, the successively and successfully received maximum sequence number by the data frame that is received prior to the current received data frame is 100, the first frame set has the sequence number of 103, and the second frame set has the sequence number of 104, because the successively and successfully received maximum sequence number is not yet updated by the current received data frame, unlike in the third embodiment, the process of searching the subsequent SH field is continued even if SH field SH3 is determined to be erroneous.

Even if the data items are randomly set in the physical packet, the condition to transmit the acknowledgement frame can be satisfied, and the redundant process of searching the SH field can be stopped after the wireless communication terminal on the data reception side extracts the significant data, so that the power consumption can be reduced.

Fifth Embodiment

A fifth embodiment is based on the first embodiment. In the configuration of the first embodiment, the fifth embodiment has a configuration in which the information retained by the receiving buffer is discarded every time the reception process of a data frame is ended.

In the first embodiment, because the wireless communication terminal on the data transmission side is notified of the successively and successfully received maximum sequence number, the frame set corresponding to the sequence number larger than the successively and successfully received maximum sequence number becomes the target of the retransmission in the wireless communication terminal on the data transmission side. Even if the frame sets are retained in the receiving buffer while some sequence numbers are partially skipped in the wireless communication terminal on the data reception side, the wireless communication terminal on the data transmission side performs the retransmission including the already-received frame sets. Therefore, the wireless communication terminal on the data reception side receives the overlapping frame sets. Accordingly, there is no problem even if the portion of the receiving buffer where the sequence numbers are partially skipped is discarded.

Figure 18:
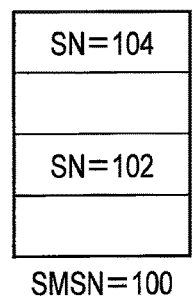
FIG. 18 shows states of a receiving buffer and an SMSN retention unit according to a fifth embodiment.

This will be described with reference to FIG. 18. FIG. 18 conceptually illustrates items of information on the receiving buffer 14 and the SMSN retention unit 16 of FIG. 3. In FIG. 18, the items of information on the frame bodies corresponding to the sequence numbers 102 and 104 are retained in the receiving buffer 14, and the successively and successfully received maximum sequence number is 100 by referring to the SMSN retention unit 16. Because the frame sets are successive up to the sequence number of 100, they are passed to the next process, and with the receiving buffer being managed in the order of the sequence numbers, the frame bodies corresponding to the sequence numbers 101 and 103 are not yet received. At this point, in the operation of the fifth embodiment, the items of information on the frame bodies corresponding to the sequence numbers 102 and 104 retained by the receiving buffer are discarded when the process is ended with respect to the received data frame. Specifically, when recognizing that the processing is completed to the received data frame, the deaggregation/filter unit 12 of FIG. 3 indicates to the reception coordinator 18 of the end of processing the received frame. When receiving the indication of the end of processing the received frame from the deaggregation/filter unit 12, the reception coordinator 18 receives the frame bodies up to the successively and successfully received maximum sequence number from the receiving buffer 14 and issues an instruction to delete the retained information to the receiving buffer 14. Alternatively, the reception coordinator 18 does not issue the instruction to the receiving buffer, but reception coordinator 18 may delete the information retained by the receiving buffer.

Even if the frame sets are set in the data frame while the sequence numbers are not always in successively increasing order, whether there is a sequence number that becomes the SMSN can securely be confirmed up to the final portion of the data frame, and it is not necessary to retain the unnecessary information in the receiving buffer after the receiving process. Therefore, the use of the memory can be reduced.

Sixth Embodiment

A sixth embodiment can be applied to the first to fifth embodiments. In a configuration of the sixth embodiment, a criterion for determination whether the wireless communication terminal on the data transmission side performs the transmission within the proper range of sequence numbers is provided in the wireless communication terminal on the data reception side.

In the first embodiment, the plurality of frame sets can be set in one data frame while aggregated. On the other hand, the wireless communication terminal on the data reception side performs the operation to sequentially transfer the frame sets to the upper layer process such that their sequence numbers are in successively increasing order. Therefore, it is necessary to take into account the range of the sequence numbers of the frame sets including the new and retransmitted frame sets in the wireless communication terminal on the data transmission side, namely, a sliding window on the data transmission side, and a receiving buffer size in the wireless communication terminal on the data reception side. It is necessary that at least the number of frame sets that can be retained by the receiving buffer size be greater than or equal to the range of the sliding window on the data transmission side. Preferably a width of the sliding window on the data transmission side is equal to the number of frame sets that can be retained by the receiving buffer size. Therefore, the necessary and sufficient condition is obtained on both the data transmission side and the data reception side.

For example, it is assumed that both the width of the sliding window on the data transmission side and the receiving buffer can correspond to four frame sets. Accordingly, there is no problem when the wireless communication terminal on the data reception side receives the frame sets up to the sequence number that is larger than the successively and successfully received maximum sequence number by 4. On the other hand, when wireless communication terminal on the data reception side receives the frame set having the sequence number that is larger than the SMSN by 5 or more, the process of successively transferring the information on the frame body from the retained successively and successfully received maximum sequence number to the upper layer processor 0 cannot be performed. For example, it is assumed that the frame set having the sequence number 105 is received while the successively and successfully received maximum sequence number is 100, and it is assumed that the frame set having the sequence number 105 is retained in the receiving buffer. When four frame sets having sequence numbers 101 to 104 are received, one of the frame sets overflows from the receiving buffer, and therefore the process of successively transferring the information on the frame body to the upper layer processor 0 cannot be performed. Accordingly, when receiving the data frame including the frame set having the sequence number that is larger than the value in which the receiving buffer size (in this case, 4) is added to the successively and successfully received maximum sequence number retained at the stage at which the preceding received data frame is processed, the wireless communication terminal on the data reception side determines that the data frame violates continuity, in other words, determines violation of the sliding window, and performs the error process.

The wireless communication terminal on the data transmission side controls the sliding window on the data transmission side on the basis of the successively and successfully received maximum sequence number which the wireless communication terminal on the data reception side notifies the wireless communication terminal on the data transmission side in the acknowledgement frame. In the sixth embodiment, assuming that the sliding window has the width of 4 equal to the receiving buffer size while the successively and successfully received maximum sequence number received from the wireless communication terminal on the data reception side is 100, a starting point Win_s of the sliding window is matched with 100+1, namely, 101, and an ending point Win_e of the sliding window is 100+4, namely, 104. Therefore, only the frame sets of the sequence numbers 101 to 104 are transmitted while set in the data frame. The frame sets may be transmitted from any frame set within the sliding window, but preferably the frame sets are transmitted in the order of the sequence numbers. It is not necessary to set all the frame sets within the sliding window in the data frame at once. If the sequence numbers are within the sliding window, the number of frame sets set in the same data frame is arbitrarily determined. Desirably the frame sets having the successive sequence numbers from the starting point Win_s of the sliding window are set in one data frame, although the frame sets may randomly be set in the data frame. Therefore, the data that are efficiently received can be transferred to the upper layer processor 0 in the order of the sequence numbers in the wireless communication terminal on the data reception side.

On the other hand, when the wireless communication terminal on the data transmission side does not receive the acknowledgement frame or cannot correctly receive the acknowledgement frame while the wireless communication terminal on the data reception side transmits the successively and successfully received maximum sequence number 100 by the acknowledgement frame, the wireless communication terminal on the data transmission side does not update the sliding window on the data transmission side. Accordingly, at this point, the wireless communication terminal on the data transmission side and the wireless communication terminal on the data reception side are not synchronized with each other, but the wireless communication terminal on the data transmission side transmits the data frame again on the basis of the old sliding window. When the successively and successfully received maximum sequence number given by the preceding acknowledgement frame is 96 and is correctly received, the frame sets of the sequence numbers 97 to 100 are transmitted in the data frame, for example. In the wireless communication terminal on the data reception side, frame sets included in a data frame that are transmitted on the basis of the old sliding window should not be detected as the violation of continuity, in other words, the violation of the sliding window. On the other hand, a data frame including frame sets having the sequence numbers smaller than that of the frame sets transmitted on the basis of the old sliding window should be detected as the violation of continuity. However, the determination is made when the preceding acknowledgement frame is correctly received.

When receiving a data frame including frame sets having the sequence numbers that are less than or equal to the value in which the receiving buffer size (in this case, 4) is subtracted from the currently retained successively and successfully received maximum sequence number, the wireless communication terminal on the data reception side determines that the data frame violates continuity. That is, when a frame set having the sequence number 96 or less is received while the frame sets up to the sequence number 100 are received already, the wireless communication terminal on the data transmission side performs transmission while ignoring the width of the sliding window on the data transmission side. Even if the minimum sequence number in a data frame is 97, when the data frame also includes a frame set having the maximum sequence number 101 or more, the wireless communication terminal on the data reception side determines that the data frame violates continuity. In such cases, the error process is started as previously described.

In the configuration of the wireless communication terminal of FIG. 3, the detection of the violation of continuity, in other words, the violation of the sliding window in the wireless communication terminal on the data reception side may be processed as follows.

Detection of violation when sequence number being excessively small:

Example 1

The deaggregation/filter unit 12 ends the reception of the data frame while extracting the minimum sequence number in the data frame, and the deaggregation/filter unit notifies the reception coordinator 18 of the minimum sequence number when transmitting the notification of the end of the reception frame process to the reception coordinator 18. When receiving the notification of the end of the reception frame process from the deaggregation/filter unit 12, the reception coordinator 18 extracts the minimum sequence number in the notification to compare the minimum sequence number with the SMSN retained by the SMSN retention unit 16. When the minimum sequence number is less than or equal to the value in which the receiving buffer size is subtracted from the SMSN, the error process is started.

Example 2

Alternatively, the deaggregation/filter unit 12 transmits the notification of the start of the data frame reception and the notification of the end of the data frame reception to the receiving buffer 14. When receiving the notification of the start of the data frame reception, the receiving buffer 14 retains the minimum sequence number among the sequence numbers input from the deaggregation/filter unit 12 from that point of time. When receiving the notification of the end of the data frame reception, the receiving buffer 14 compares the minimum sequence number with the SMSN retained by the SMSN retention unit 16. When the minimum sequence number is less than or equal to the value in which the receiving buffer size is subtracted from the SMSN retained by the SMSN retention unit 16, the receiving buffer 14 issues the instruction to perform the error process to the reception coordinator 18.

Following Example 1, the error process can be performed while the transmission of the acknowledgement frame is stopped. Following Example 2, the error process is started after the acknowledgement frame is transmitted. In order to stop the transmission of the acknowledgement frame, the reception coordinator 18 provides a procedure to confirm whether the comparison process in the SMSN retention unit 16 normally ended when the reception coordinator 18 receives the notification of the end of the reception frame process from the deaggregation/filter unit 12.

Detection of violation when sequence number being excessively large:

The deaggregation/filter unit 12 transmits the notification of the start of the data frame reception to the receiving buffer 14. When receiving the notification of the start of the data frame reception from the deaggregation/filter unit 12, the receiving buffer 14 obtains the SMSN from the SMSN retention unit 16. When the sequence number that is input from the deaggregation/filter unit 12 after the notification of the start of the data frame reception is larger than the value in which the receiving buffer size is added to the obtained SMSN, the receiving buffer 14 issues the instruction to perform the error process to the reception coordinator 18.

At this point, in the error process, preferably the connection to the wireless communication terminal on the data transmission side is released by transmitting a management frame for release (disconnection). All the frame sets included in the data frame in which the violation of continuity is detected are discarded.

As described above, the sequence number is allocated by the integral counter, and the integral counter performs a cyclic operation in which the count is performed from the minimum value (0) when the count value reaches the maximum value. Accordingly, although the sequence numbers are expressed "small" or "large", the actual values do not become small or large at a boundary at which the count value returns to the minimum value. For example, the integral counter has the maximum value of 255, the receiving buffer size is 4, the currently retained SMSN is 253, and the SMSN is transmitted while set in the acknowledgement frame. At this point, the case in which the next received data frame includes the frame sets having only the sequence numbers 250, 251, 252, and 253, or the case in which the next received data frame includes the frame sets having only the sequence numbers 254, 255, 0 (=256−256), and 1 (=257−256) is determined to be normal, and other cases are determined to be violation.

In order to have the wireless communication terminal on the data transmission side and the wireless communication terminal on the data reception side common recognition of the sliding window width and the receiving buffer size, a method in which the wireless communication terminal on the data transmission side and the wireless communication terminal on the data reception side notifies each other of the sliding window width and the receiving buffer size using the management frames before data frames are transmitted can be used, for example. By at least notifying of the receiving buffer size of the wireless communication terminal on the data reception side, the wireless communication terminal on the data transmission side can set the sliding window width less than or equal to the indicated receiving buffer size. Alternative method would be that, the wireless communication terminal on the data transmission side and the wireless communication terminal on the data reception side do not notify each other using the management frames, but the sliding window width and the receiving buffer size are uniquely specified as the system.

Therefore, the operation to transfer data to the upper layer processor 0 in the order of the sequence numbers can be guaranteed in the wireless communication terminal on the data reception side.

Seventh Embodiment

A seventh embodiment can basically be applied to the first embodiment or the sixth embodiment. In the configuration of the sixth embodiment, the situation in which the receiving buffer of the wireless communication terminal becomes unable to receive a new frame set (i.e., becomes full) is considered.

In the receiving buffer of the wireless communication terminal that receives data frames, when the frame bodies having the successive sequence numbers are received, usually the frame bodies are passed to the next process. In the first embodiment, the receiving buffer 14 of FIG. 3 transfers the frame bodies corresponding to the successive sequence numbers to the upper layer processor 0 through the reception coordinator 18. At this point, when the receiving buffer 14 transfers the frame body to the reception coordinator 18, for example, it is assumed that the reception coordinator 18 notifies the receiving buffer 14 of whether the frame body is normally received and the receiving buffer 14 recognizes whether the frame body is normally transferred to the reception coordinator 18 by the notification. Even in transferring various data items including the frame body information between the reception coordinator 18 and the upper layer processor 0, it is assumed that whether the transfer of the data items is completed normally is recognized on the basis of a notification signal between the receiving buffer 14 and the reception coordinator 18. For example, when the reception coordinator 18 can not transfer the previous frame body to the upper layer processor 0 because the process in the upper layer processor 0 is delayed, even if there are frame bodies corresponding to the successive sequence numbers in the receiving buffer 14, the frame bodies cannot be transferred to the reception coordinator 18 (a notification signal of failure is returned even if the frame bodies are transferred), and the frame bodies (and their corresponding sequence number information) are still retained by the receiving buffer. In the situation, even if the wireless communication terminal on the data transmission side properly controls the sliding window on the data transmission side to transmit a data frame including frame bodies having proper sequence numbers, possibly the receiving buffer in the wireless communication terminal on the data reception side is full, and the receiving buffer cannot receive the new data frame.

In such case, in the seventh embodiment, because the transfer of the frame bodies corresponding to the successive sequence numbers from the receiving buffer 14 to the reception coordinator 18 is not completed, the SMSN retention unit 16 does not receive notification of the sequence numbers. That is, the SMSN retention unit 16 does not update the successively and successfully received maximum sequence number. The successively and successfully received maximum sequence number that is set in the acknowledgement frame transmitted after the reception of the data frame is completed is the sequence number retained by the SMSN retention unit 16, namely, the sequence number corresponding to the frame body that the receiving buffer 14 was able to transfer normally to the next process.

Figure 19:
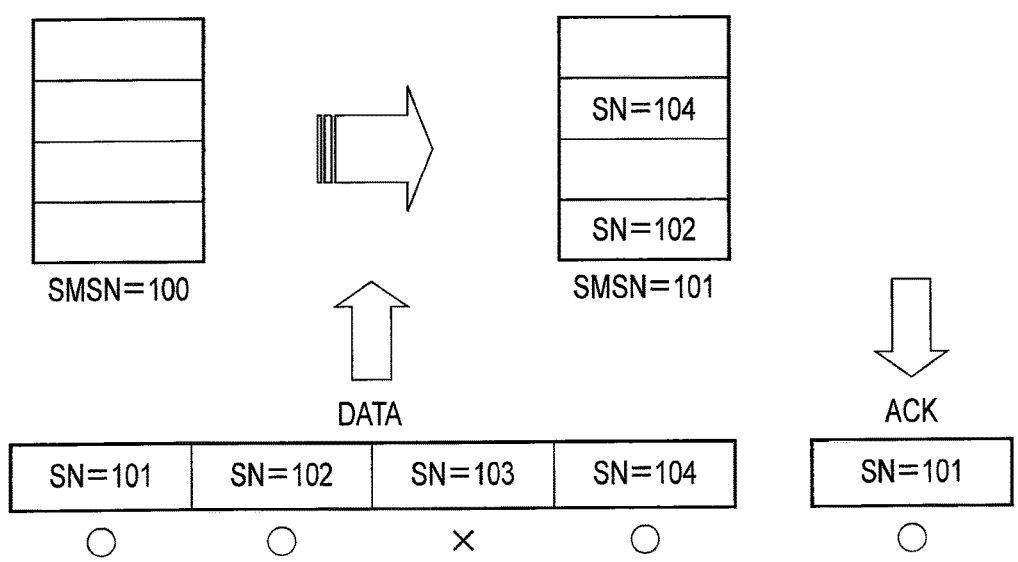
FIG. 19 shows an example of a relationship among states of a receiving buffer and an SMSN retention unit, reception of a data frame, and transmission of an acknowledgement frame according to a seventh embodiment.

For example, as illustrated in FIG. 19, it is assumed that the SMSN retention unit 16 retains 100 as the successively and successfully received maximum sequence number while the empty receiving buffer 14 having the receiving buffer size of 4 can receive data frames. It is also assumed that, when a data frame including frame bodies corresponding to sequence numbers 101 to 104 is received, the deaggregation/filter unit 12 can correctly extract the frame bodies except the frame body having the sequence number 103. The frame bodies corresponding to the sequence numbers 101, 102, and 104 are transferred to the receiving buffer 14 along with the sequence numbers thereof, and the receiving buffer 14 transfers the frame body corresponding to the sequence number 101 to the next process because the sequence number 101 is larger than the sequence number 100 retained by the SMSN retention unit 16 by 1 and successive. Then the SMSN retention unit 16 retains the value of 101. It is assumed that the transfer process is unsuccessfully performed although the next frame body has the successive sequence number 102. Therefore, the acknowledgement frame is transmitted while the sequence number 101 is set in the acknowledgement frame, as illustrated in FIG. 19, instead of setting the sequence number 102 in the acknowledgement frame. In response to the acknowledgement frame, possibly the wireless communication terminal on the data transmission side transmits a data frame in which the frame sets corresponding to the sequence numbers 102 to 104 of the retransmission targets and a frame set corresponding to a new sequence number 105 are set, as illustrated in FIG. 20. However, when the receiving buffer can not pass the frame body corresponding to the sequence number 102 to the next process, even if the receiving buffer could pass all the sequence numbers 102 to 105 to the next process because all the frame sets are received correctly, the acknowledgement frame in which the sequence number 101 is set is transmitted.

The pieces of information on the sequence numbers 102 and 104 in the receiving buffer on the right hand side of FIG. 19 may be discarded at the same time as the acknowledgement frame is transmitted. In FIG. 20, the frame sets corresponding to the sequence number 102 or more may be discarded because the frame sets are the retransmission targets.

When receiving an acknowledgement frame in which the successively and successfully received maximum sequence number is not increased by a plurality of times, the wireless communication terminal on the data transmission side presumes that the receiving buffer of the wireless communication terminal on the data reception side can not pass the frame body to the next process, and the wireless communication terminal on the data transmission side can perform the control so as to wait the transmission of the data frame for a while. When the receiving buffer falls in the situation in which the receiving buffer can not pass the frame bodies having the successive sequence numbers to the next process, a time until the situation is solved is estimated, the estimated time is transmitted by an acknowledgement frame or by a different frame instead of an acknowledgement frame, and the wireless communication terminal on the data reception side and the wireless communication terminal on the data transmission side may perform a power saving operation during the estimated time. For example, the technique disclosed in JP-A No. 2010-259171 (KOKAI) may be used to estimate the time until the situation is solved, when the receiving buffer falls in the situation in which the receiving buffer can not pass the frame bodies having the successive sequence numbers to the next process. That is, the technique of estimating the waiting time until the free space in which the payload data can be stored is secured in the receiving buffer may be used in the wireless communication device that generates a buffer-full signal when the size of the received payload data is larger than a free space in the receiving buffer. The waiting time can be estimated on the basis of the time for which data are transferred from the receiving buffer to an upper layer protocol or a host system or the time required for an operating sequence of the storage to which data are transferred. Specifically, the waiting time can be estimated on the basis of a relationship between a preparation time for writing data in a hard disk drive or a flash memory, data amount, a data transfer rate, and a transfer time in an interface of a USB (Universal Serial Bus) device or a PCI (Peripheral Component Interconnect) device, etc.

In the seventh embodiment, the receiving buffer 14 transfer the frame body to the upper layer processor 0 through the reception coordinator 18. Alternatively, the frame body may directly be transferred to the upper layer processor 0. At this point, the transfer of the notification signal relating to the reception of the frame body takes place between the receiving buffer 14 and the upper layer processor 0 instead of between the receiving buffer 14 and the reception coordinator 18.

Therefore, the situation in which the receiving buffer of the wireless communication terminal becomes unable to receive a new frame set (i.e., becomes full) can be dealt with in the wireless communication terminal on the reception side of data frames.

Eighth Embodiment

An eighth embodiment is based on the first embodiment. The eighth embodiment specifies the operation in the case of existence of the wireless communication terminal that cannot correspond to receiving a data frame having a plurality of frame sets aggregated given by the first embodiment. For example, the eighth embodiment relates to coexistence with a wireless communication terminal that is capable of receiving a data frame having aggregated frame sets up to two, but not capable of aggregated frame sets more than that.

Even if the wireless communication terminal of the first embodiment possibly transmits the data to the other wireless communication terminal that is not capable of receiving a data frame having aggregated frame sets more than two, the wireless communication terminal of the first embodiment recognizes a capability of the other wireless communication terminal of the communication pair in a procedure to establish the connection to the other wireless communication terminal of the communication pair before data frames are transmitted, which allows the proper configuration of the data frame to be used. For example, in establishing a connection, it is assumed that one of the wireless communication terminals transmits the management frame of a connection request, and it is assumed that the wireless communication terminal that receives the management frame transmits the management frame of a connection response when accepting the connection request. When the version corresponding to each of the wireless communication terminals is described in each of the management frames, when there is a difference between the versions, the wireless communication terminal having the higher version can recognize that the reception can be performed up to which data frame in the lower version, and the transmission may be restricted to the method corresponding to the lower version when data frames are transmitted.

Here, it is assumed that the format in which the notification of the sequence number is made like the first embodiment is also used for the acknowledgement frame in the lower version. When the wireless communication terminal having the higher version is the data reception side, there is no problem in transmitting an acknowledgement frame in response to a data frame containing only one frame body on the basis of the first embodiment. Because frame bodies are transmitted in the order of the sequence numbers, when a data frame including only one frame body is correctly received, the successively and successfully received maximum sequence number is updated with the sequence number relating to the frame body. Therefore, when an acknowledgement frame is transmitted while the sequence number is set in the acknowledgement frame, the wireless communication terminal on the data transmission side can normally process the acknowledgement frame because the wireless communication terminal on the data transmission side normally receives the acknowledgement frame in the lower version. Even if the wireless communication terminal which can only include two frame bodies in a data frame is the data transmission side while the wireless communication terminal that can receive a data frame including three or more frame bodies is the data reception side, the acknowledgement frame may be transmitted on the basis of the first embodiment. This is because the wireless communication terminal on the data transmission side recognizes that the sequence numbers up to the indicated sequence number are normally received by the wireless communication terminal on the data reception side to appropriately determine the retransmission.

Even if the wireless communication terminal having the lower version receives a data frame or an acknowledgement frame based on the first embodiment as a third party, because the Rx UID of the CH header does not specify the wireless communication terminal, the data frame or the acknowledgement frame is discarded.

Even in the case of a data frame, in which the frame sets are aggregated with the number of frame sets that cannot be dealt with by the wireless communication terminal on the data reception side, being transmitted, if the number of aggregated frame sets is described in the SH field, for example, whether the number of aggregated frame sets is less than or equal to the number of frame sets that can be dealt with can be confirmed to perform a proper process. For example, the frame sets up to the number of frame sets that can be dealt with may be accepted at the reception process. However, because this becomes a similar situation to that of the sixth embodiment, preferably the management frame disconnecting the connection, in other words, the management frame releasing the communication link, is transmitted to the wireless communication terminal on the data transmission side. Preferably the management frame disconnecting the connection notifies of the reason such as the version is different, or such as the data frame including the number of frame sets exceeding the number of frame sets that can be dealt with is transmitted. Therefore, after selecting properly the transmission method, the wireless communication terminal on the data transmission side that receives the management frame can exchange management frames for the procedure to set up reconnection with the other wireless communication terminal of the communication pair to resume the transmission of data frames.

Even if there is a wireless communication terminal that is not capable of the first embodiment, the proper process can be performed between the wireless communication terminal that is capable of the first embodiment and the wireless communication terminal that is not capable of the first embodiment, and the wireless communication system does not break down.

Ninth Embodiment

A ninth embodiment basically relates to a modification of the seventh embodiment. In the seventh embodiment, only the sequence number that can be transferred from the receiving buffer 14 to the next process is retained as the successively and successfully received maximum sequence number. In the ninth embodiment, the sequence number that cannot be transferred from the receiving buffer 14 to the next process but is the maximum sequence number further successive is also retained, and the latter sequence number is set in the acknowledgement frame.

For the sake of convenience, the SMSN that can be transferred from the receiving buffer 14 to the next process is expressed by SMSN_B, and the successively and successfully received maximum sequence number with the status of the receiving buffer 14 taken into account is expressed by SMSN_R.

Similarly to the above-described embodiments, SMSN_B is the sequence number corresponding to the frame body that is retained by the SMSN retention unit 16 at the time when the transfer is successfully performed when the frame bodies are transferred from the receiving buffer 14 to the reception coordinator 18 such that the sequence numbers are increased one by one.

SMSN_R is the successively and successfully received maximum sequence number when the sequence numbers of the frame sets retained by the receiving buffer 14 are taken into account. In the receiving buffer 14, the frame sets are managed on the basis of the sequence numbers. When the frame body having the successive sequence number from SMSN_B is correctly received in the receiving buffer 14, the value of SMSN_R is updated, and the SMSN retention unit 16 is notified of the SMSN_R. When a processing time for which the receiving buffer 14 transfers the frame body to the reception coordinator 18 is ideally eliminated, SMSN_R becomes identical to SMSN_B. However, actually there is a processing delay. Even if the sequence numbers are successive like the situation in the seventh embodiment, sometimes some of the frame bodies cannot be transferred from the receiving buffer 14 to the reception coordinator 18. In such case, the value of SMSN_R differs from the value of SMSN_B.

The reception coordinator 18 concurrently transmits the value of SMSN_R when issuing the instruction to transmit the acknowledgement frame to the transmission processor 20, and the transmission processor 20 transmits the acknowledgement frame with the value of SMSN_R set in the SN field of.

The specific operation will be described with reference to FIGS. 21 to 23. The receiving buffer size is set to 4 similarly to the seventh embodiment of FIGS. 19 and 20. In FIG. 21, the receiving buffer 14 is empty and in a receivable state, and SMSN_B 100 and SMSN_R 100 are retained in the SMSN retention unit 16. It is also assumed that, when a data frame including frame bodies corresponding to sequence numbers 101 to 104 is received, the deaggregation/filter unit 12 can correctly extract the frame bodies except the frame body having the sequence number 103. The frame bodies corresponding to the sequence numbers 101, 102, and 104 are transferred to the receiving buffer 14 along with the sequence numbers thereof, and the receiving buffer 14 transfers the frame body corresponding to the sequence number 101 to the next process because the sequence number 101 is larger than SMSN_B 100 retained by the SMSN retention unit 16 by 1 and successive. Then SMSN_B 101 and SMSN_R 101 are retained in the SMSN retention unit 16. Because the next frame body corresponding to the sequence number 102 is also successive, the receiving buffer 14 updates SMSN_R 101 of the SMSN retention unit 16 with 102. However, the operation of transferring the frame body to the next process is not yet accepted. Accordingly, SMSN_B is 101, and SMSN_R is 102. After the data frame is received, the acknowledgement frame in which the sequence number 102 is set is transmitted as illustrated in FIG. 21. At this point, the wireless communication terminal on the data reception side may discard the frame set corresponding to the sequence number 104. When the width of the sliding window on the transmission side is set to 4 equal to the receiving buffer size of the wireless communication terminal on the data reception side, in response to the acknowledgement frame, possibly the wireless communication terminal on the data transmission side transmits the data frame in which the frame sets corresponding to the sequence numbers 103 and 104 of the retransmission targets and frame sets corresponding to new sequence numbers 105 and 106 are set as illustrated in FIG. 22. In the situation in which the frame body corresponding to the sequence number 102 is not passed to the next process even if the wireless communication terminal on the data reception side was able to receive all the frame sets correctly, SMSN_R becomes 105 that is the maximum sequence number that can be retained by the receiving buffer 14 while SMSN_B is 101. The frame set corresponding to the sequence number 106 cannot be set in the receiving buffer 14, but discarded. The SN field of the acknowledgement frame to be transmitted is set to 105. It is assumed that, in response to the acknowledgement frame of FIG. 22, the wireless communication terminal on the data transmission side transmits a data frame in which the frame set corresponding to the sequence number 106 that becomes the retransmission target and frame sets corresponding to new sequence numbers 107 to 109 are set, as illustrated in FIG. 23. In the situation in which the frame body corresponding to the sequence number 102 is not passed to the next process even if the deaggregation/filter unit 12 was able to receive all the frame sets correctly in the wireless communication terminal on the data reception side, SMSN_R is 105 while the SMSN_B is 101 because the receiving buffer 14 cannot retain the new frame sets, namely, the frame sets corresponding to the sequence numbers 106 to 109. The acknowledgement frame in which the 105 is set in the SN field is transmitted again.

The operation similar to that of the seventh embodiment is performed after the sequence number which the acknowledgement frame indicates does not increase.

According to the ninth embodiment, the acknowledgement frame is transmitted while the value of SMSN_R is set in the SN field of the acknowledgement frame. Therefore, the wireless communication terminal on the data transmission side can perform the transmission including the retransmission of the frame set up to the range that is permissible in the receiving buffer 14, and the communication efficiency can be improved.

As described above, according to the ninth embodiment, wireless communication terminal on the data transmission side is able to transmit frame sets equal to or more than the number of frame sets that can be retained by the receiving buffer 14. According to the sixth embodiment, this is the violation of continuity in the wireless communication terminal on the data reception side. However, this is not the violation of continuity because the wireless communication terminal on the data transmission side controls the sliding window on the basis of the value of the SN field described in the acknowledgement frame. Accordingly, in the ninth embodiment, when the data frame including the frame set having the sequence number larger than the value of the SN field described in the acknowledgement frame, namely, the sequence number of SMSN_R, by the receiving buffer size or more is received, the wireless communication terminal on the data transmission side makes the determination of the violation of continuity to start the error process. In FIGS. 22 and 23, some frame sets can not be hold in the receiving buffer 14. However, because the frame sets fall within the range of SMSN_R+4, the frame sets do not violate continuity. For example, in FIG. 22, the determination of the violation of continuity is made when the data frame in which the frame set corresponding to the sequence number 107 is also set is received because SMSN_R=102.

Tenth Embodiment

A tenth embodiment can be applied to the first to ninth embodiments. The tenth embodiment relates to processing when fragmented data are received.

When the data are fragmented, the fragmented data items are set in the plurality of frame sets on the basis of the first embodiment, and their sequence numbers are in successively increasing order. A more-fragment field (hereinafter referred to as an FM field) in which the information on the fragment is set is provided in the SH field. The FM field is set to 0 in the frame set when the data are not fragmented, or when the frame set contains the final fragment. In other cases, namely, when there are continued fragmented data, the FM field is set to 1. Accordingly, preferably the size of the FM field is set to 1 bit.

In the wireless communication terminal on the data reception side, the receiving buffer 14 transfers the frame bodies to the reception coordinator 18 in the order in which their sequence numbers successively increase, and the value of FM field is also transferred at the same time. Therefore, the reception coordinator 18 performs defragment process of combining the current frame body with the frame body corresponding to the next sequence number as one data item when the FM field is set to 1. When the FM field is set to 0, the frame body is directly transferred to the upper layer processor 0 without waiting for the next frame body.

When frame sets are directly transferred from the receiving buffer 14 to the upper layer processor 0, the defragment process may be provided in the upper layer processor 0.

Therefore, even if the data frame in which the data are fragmented is received, the wireless communication terminal on the data reception side can recover the original data from the fragmented data, namely, perform the defragment process.

Eleventh Embodiment

An eleventh embodiment can be applied to the first to tenth embodiments. The eleventh embodiment relates to conditions to generate and transmit the acknowledgement frame. Specifically, the acknowledgement frame is generated and transmitted when at least one subheader field is determined to be correct by the HCS field in the received data frame.

In the configuration of the wireless communication terminal of the first embodiment with reference to FIG. 3, the deaggregation/filter unit 12 is changed as follows. That is, the deaggregation/filter unit 12 starts the processing to the received frame and issues the instruction to start the preparation of the acknowledgement frame to the reception coordinator 18 when the information in the SH field is correctly extracted and that is the first one from the received frame.

For example, the state of FIG. 7 in the first embodiment is considered again. In the first embodiment, the reception is failed with respect to the frame sets 1, 2, and 3 corresponding to the sequence numbers 101, 102, and 103, and the subheader SH4 in the frame set 4 corresponding to the sequence number 104 is determined to be not erroneous (i.e., correct). However, the error is detected by the FCS field associated with FB field FB4, and therefore the acknowledgement frame is not generated and transmitted. However, in the eleventh embodiment, because the SH field SH4 can be correctly extracted, the acknowledgement frame is generated and transmitted. The method for setting the sequence number which the acknowledgement frame indicates is the same with that of the first to tenth embodiments. That is, the successively and successfully received maximum sequence number is not updated by receiving the data frame. If the data frames up to the sequence number 100 are successfully received before the reception of the data frame of FIG. 6, the sequence number 100 is retained as the maximum sequence number. In such case, the acknowledgement frame in which the sequence number 100 is set is transmitted in response to the data frame of FIG. 6.

The wireless communication terminal that transmitted the data frame recognizes it is necessary to retransmit the data items from the sequence number 101. And further by the fact that the acknowledgement is received from the wireless communication terminal of the destination, the wireless communication terminal can recognize that some of the data items successfully reached the wireless communication terminal of the destination, namely, the connection state is maintained, and that the wireless communication terminal of the destination is currently in a receivable state even if the wireless communication terminal of the destination performs a power-saving operation. This serves as a substitute for transmitting a probe frame to confirm the connection with the other wireless communication terminal of the communication pair or confirm whether the other wireless communication terminal of the communication pair is in a receivable state.

Twelfth Embodiment

A twelfth embodiment can be applied to the first to eleventh embodiments. The twelfth embodiment relates to the operations in the wireless communication terminal on the data transmission side and the wireless communication terminal on the data reception side when no response to the initial data frame is received after the connection is established.

In the initial data frame after the connection is established, on the basis of the second embodiment, the bit (SYNC) indicating the start of the sequence number is set in the SH field of the frame set in which the initial sequence number is set. The wireless communication terminal on the data reception side correctly receives the SH field in which the bit indicating the start of the sequence number is set and transmits the acknowledgement frame when the response condition is satisfied. At this point, the corresponding bit (SYNC) is also set in the SH field of the acknowledgement frame.

The case in which the wireless communication terminal on the data transmission side cannot correctly receive the acknowledgement frame in which the bit is set is described in the twelfth embodiment.

The case will be described with reference to FIG. 24. In FIG. 24, assuming that the sequence number is started from the sequence number 253 (starting point of sliding window Win_s=253), the frame set to which the sequence number 253 is allocated is located first in the data frame, and the bit indicating the start of the sequence number is set in the frame set (SYNC=1 and SN=253). Other three frame sets are aggregated in the same data frame. The three frame sets have the sequence numbers 254, 255, and 0, respectively. It is assumed that the maximum number of a counter for the sequence numbers is 255, and it is assumed that the counter returns to 0 when reaching the maximum number 255. When all the frame sets of the data frame are correctly received, the acknowledgement frame showing that the successively and successfully received maximum sequence number is 0 and that the notification of the start of the sequence number is received (SYNC=1 and SN=0) is transmitted because the successively and successfully received maximum sequence number becomes 0 in the wireless communication terminal on the data reception side. Here, it is assumed that the acknowledgement frame is not correctly received by the wireless communication terminal on the data transmission side. At this point, the wireless communication terminal on the data transmission side does not change the sliding window on the data transmission side (Win_s=253). The wireless communication terminal on the data transmission side waits for the acknowledgement frame for a predetermined time after transmitting the initial data frame. The wireless communication terminal on the data transmission side retransmits the data frame with the predetermined IFS when determining that the acknowledgement frame is not received after a predetermined time elapses. In the twelfth embodiment, as illustrated in FIG. 24, the transmission is performed while the frame sets from the sequence number 253 are set in the data frame. Because the wireless communication terminal on the data transmission side cannot confirm that the wireless communication terminal on the data reception side received the notification of the start of the sequence number by the acknowledgement frame, the bit indicating the start of the sequence number is set again in the frame set having the sequence number 253 (SYNC=1 and SN=253). The wireless communication terminal on the data reception side that receives the retransmitted data frame transmits the acknowledgement frame to continue the data frame exchange as described previously. On the other hand, the wireless communication terminal on the data reception side starts the error process when receiving data frames illustrated below the downward arrow in FIG. 24. When the starting sequence number is different from the former one (SYNC=1 and SN=254) as illustrated by the first data frame below the downward arrow, or when the bit indicating the start of the sequence number is not set as illustrated by the second data frame below the downward arrow (SYNC=0 and SN=253), the wireless communication terminal on the data reception side starts the error process.

A processing method in which the wireless communication terminal on the data reception side determines that the two data frames below the downward arrow are erroneous while the retransmitted data frame in the upper portion of FIG. 24 is correct will specifically be described below.

For example, in the wireless communication terminal, two parameters Sync1 and StartSN are prepared to perform the determination process. At least Sync1 is set to 0 immediately after the connection is established.

When the wireless communication terminal receives the initial data frame from the other wireless communication terminal of communication pair after the connection is established (that is, when Sync1 is 0: condition 1), the bit indicating the start of the sequence number is set in the first frame set of the data frame, and the bit indicating the start of the sequence number is not set in the correct SH fields of all the other frame sets (condition 2). At this point, the wireless communication terminal determines that the use of the bit indicating the start of the sequence number is correct. The SN field (sequence number) of the SH field in which the bit indicating the start of the sequence number is set is written in StartSN, and Sync1 is incremented by 1 (that is, Sync1 becomes 1). This is the process performed in receiving the initial data frame in FIG. 24. When condition 2 is not satisfied, the error process is started because the use of the bit indicating the start of the sequence number is not correct.

When the wireless communication terminal receives once a data frame in which the use of the bit indicating the start of the sequence number is correct after the connection is established (that is, when Sync1 is 1: condition 3), the wireless communication terminal determines whether a condition 4 is satisfied. The condition 4 is that, the bit indicating the start of the sequence number is set in the first frame set of the subsequently received data frame, and the bit indicating the start of the sequence number is not set in the correct SH fields of all the other frame sets. When condition 4 is satisfied, the wireless communication terminal determines whether the SN field (sequence number) of the SH field in which the bit indicating the start of the sequence number is equal to the retained StartSN (condition 5). When the SN field (sequence number) is equal to the retained StartSN, the wireless communication terminal determines that the use of the bit indicating the start of the sequence number is correct. Sync1 is maintained (that is, Sync1 is 1). This is the process performed in receiving the correct retransmitted data frame in FIG. 24. On the other hand, when condition 5 is not satisfied, the error process is started because the use of the bit indicating the start of the sequence number is not correct. This is the process performed in receiving the first data frame below the downward arrow in FIG. 24. When condition 4 is not satisfied, the wireless communication terminal determines whether the bit indicating the start of the sequence number is not set in the frame sets of all the correct SH fields included in the received data frame (condition 6). When condition 6 is satisfied, the wireless communication terminal determines whether the minimum sequence number included in the received data frame is larger than StartSN (condition 7). When condition 7 is satisfied, the wireless communication terminal determines that the use of the bit indicating the start of the sequence number is correct. Sync1 is incremented by 1 (that is, Sync1 becomes 2). This is the process performed in the case, in which the wireless communication terminal correctly receives an acknowledgement frame to the initial data frame after the connection is established and the sliding window on the data transmission side is updated to transmit a next data frame. When condition 7 is not satisfied, the error process is started because the use of the bit indicating the start of the sequence number is not correct. This is the process performed in receiving the second data frame below the downward arrow in FIG. 24. When condition 6 is not satisfied, the error process is started because the use of the bit indicating the start of the sequence number is not correct.

In receiving the next data frame after the wireless communication terminal correctly receives the acknowledgement frame to the initial data frame following the connection establishment and the sliding window on the data transmission side is updated to transmit a next data frame (that is, when Sync1 is 2, and when neither condition 1 nor condition 2 is satisfied), the wireless communication terminal determines that the use of the bit indicating the start of the sequence number is correct, when the bit indicating the start of the sequence number is not set in the frame sets of all the correct SH fields included in the received data frame (condition 8). Sync1 is maintained (that is, Sync1 is 2). When condition 8 is not satisfied, the error process is started because the use of the bit indicating the start of the sequence number is not correct.

FIG. 25 illustrates an example in which a processing operation to determine whether the bit indicating the start of the sequence number is correctly used is expressed in C-like language.

Thus, after the connection is established, because the initial data frame has a role in making the indication of the start of the sequence number, it is necessary to securely transmit the initial data frame to the wireless communication terminal on the data reception side. Desirably the robust modulation and coding scheme is selected, more desirably the most robust modulation and coding scheme is selected.

Therefore, the wireless communication terminal on the data reception side can securely receive indication of the start of the sequence number. Therefore, the operation can be demonstrated when the wireless communication terminal on the data transmission side cannot correctly receive the acknowledgement frame which is a response to the data frame and includes the indication of the start of the sequence number, and the problem that the mutual connection cannot be established due to different implementation can be avoided.

In the first to twelfth embodiments, the wireless communication terminal on the data transmission side and the wireless communication terminal on the data reception side are described while distinguished from each other. However, this relationship is not unique, and data may mutually be transmitted between two wireless communication terminals. At this point, when a data flow on one side is viewed, one of the wireless communication terminals becomes the data transmission side while the other wireless communication terminal becomes the data reception side. However, the relationship is changed when the data flow on the other side is viewed.

Thirteenth Embodiment

A wireless communication terminal according to a thirteenth embodiment includes a buffer in addition to the configuration of the wireless communication device unit of the wireless communication terminal of FIG. 3. The wireless communication device of the thirteenth embodiment is configured to include the buffer, which allows the transmitted and received frames to be retained in the buffer to easily perform the retransmission process and external output process.

Fourteenth Embodiment

A wireless communication terminal according to a fourteenth embodiment includes a bus, a processor, and an external interface in addition to the configuration of the wireless communication terminal of the thirteenth embodiment. The processor and the external interface are connected to the buffer through the bus. In the processor, firmware is operated. The wireless communication device of the fourteenth embodiment is configured to include the firmware, which allows a function of the wireless communication device to be easily changed.

Fifteenth Embodiment

A wireless communication terminal according to a fifteenth embodiment includes a clock generator in addition to the configuration of the wireless communication device unit of the wireless communication terminal of FIG. 3. The clock generator generates a clock and outputs the clock from an output terminal to the outside of the wireless communication device. The clock generated in the wireless communication device is externally output, and a host side is operated by the externally output clock, which allows the host side and the wireless communication device side to operate in synchronization with each other.

Sixteenth Embodiment

A wireless communication terminal according to a sixteenth embodiment includes a power supply, a power supply controller, and a wireless power feeder in addition to the configuration of the wireless communication device unit of the wireless communication terminal of FIG. 3. The power supply controller is connected to the power supply and the wireless power feeder to control selection of an electric source supplied to the wireless communication device. The wireless communication device of the sixteenth embodiment is configured to include the power supply, which allows the low-power-consumption operation in which the power supply is controlled.

Seventeenth Embodiment

A wireless communication terminal according to a seventeenth embodiment includes an SIM card in addition to the configuration of the wireless communication terminal of the sixteenth embodiment. The SIM card is connected to the upper layer processor 0 or the reception processor 10 and the transmission processor 20. The wireless communication device of the seventeenth embodiment is configured to include the SIM card, which allows authentication process to be easily performed.

Eighteenth Embodiment

A wireless communication terminal according to an eighteenth embodiment includes a moving image compression/decompression unit in addition to the configuration of the wireless communication terminal of the fourteenth embodiment. The moving image compression/decompression unit is connected to the bus. The wireless communication device of the eighteenth embodiment is configured to include the moving image compression/decompression unit. Therefore, the compressed moving image can easily be transmitted and the received compressed moving image can easily be decompressed.

Nineteenth Embodiment

A wireless communication terminal according to a nineteenth embodiment includes an LED unit in addition to the configuration of the wireless communication device unit of the wireless communication terminal of FIG. 3. The LED unit is connected to the reception processor 10 or the transmission processor 20 or the PHY processor 40. The wireless communication device of the nineteenth embodiment is configured to include the LED unit, which allows the user to easily obtain indication of the operating state of the wireless communication device.

Twentieth Embodiment

A wireless communication terminal according to a twentieth embodiment includes a vibrator in addition to the configuration of the wireless communication device unit of the wireless communication terminal of FIG. 3. The vibrator is connected to at least the reception processor 10 and the PHY processor 40. The wireless communication device of the twentieth embodiment is configured to include the vibrator, which allows the user to easily obtain indication of the operating state of the wireless communication device.

Twenty-First Embodiment

In a wireless communication terminal according to a twenty-first embodiment, as described in the first embodiment, the plurality of different PHY processors 40 are provided in addition to the configuration of the wireless communication device unit of the wireless communication terminal of FIG. 3. The wireless communication terminal of the twenty-first embodiment also includes a wireless switch. The wireless switch is connected to the plurality of different PHY processors 40 to switch communication among the different PHY processors 40. The wireless communication device of the twenty-first embodiment is configured to include the plurality of different PHY processors 40, so that the communication can be switched such that the proper PHY processor 40 is used depending on the situation.

Twenty-Second Embodiment

In a wireless communication terminal according to a twenty-second embodiment, as described in the first embodiment, the plurality of different PHY processors 40 are provided in addition to the configuration of the wireless communication device unit of the wireless communication terminal of FIG. 3. A set of the reception processor 10, the transmission processor 20, and the access controller 30, which correspond to each PHY processor 40, is provided in the wireless communication terminal of the twenty-second embodiment. The wireless communication terminal of the twenty-second embodiment also includes a wireless switch. The wireless switch is connected so as to switch communication among the sets of the reception processors 10, the transmission processors 20, and the access controllers 30, and the wireless switch switches among a plurality of communication methods of the different sets of the reception processors 10, the transmission processors 20, the access controllers 30, and the PHY processors 40. The wireless communication device of the twenty-second embodiment is configured to include the plurality of different sets of the reception processors 10, the transmission processors 20, the access controllers 30, and the PHY processors 40, so that the communication can be switched such that the proper set of the reception processor 10, the transmission processor 20, the access controller 30, and the PHY processor 40 is used depending on the situation.

Twenty-Third Embodiment

A wireless communication terminal according to a twenty-third embodiment includes a switch (SW) in addition to the configuration of the wireless communication terminal of the twenty-first embodiment. The switch is connected to the antenna 60, the plurality of different PHY processors 40, and wireless switch. The wireless communication device of the twenty-third embodiment is configured to include the switch, so that the communication in which the proper PHY processor 40 is used can be switched depending on the situation while the antenna is shared.

Twenty-Fourth Embodiment

A wireless communication terminal according to a twenty-fourth embodiment includes a switch (SW) in addition to the configuration of the wireless communication terminal of the twenty-second embodiment. The switch is connected to the antenna 60, a base of the set of the reception processors 10, the transmission processors 20, and the access controllers 30, and the wireless switch. The wireless communication device of the twenty-fourth embodiment is configured to include the switch, so that the communication can be switched such that the proper set of the reception processor 10, the transmission processor 20, the access controller 30, and the PHY processor 40 is used depending on the situation.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:
1. A wireless communication terminal comprising:
(A) a transmitter configured to transmit, to an external device, a frame which includes n frame sets each including a subheader field, a frame check sequence field, and a frame body field including data, where n is an integer equal to or greater than 2;
wherein the subheader field includes:
a sequence number field which notifies a sequence number;
a fragment information field which notifies whether or not the data is a last fragment; and
a frame body length field which notifies a length of the frame body field; and
(B) a receiver configured to receive, from the external device, a response frame notifying a successively and successfully received maximum sequence number,
wherein:
the successively and successfully received maximum sequence number indicates a value obtained by subtracting 1 from a first sequence number, if any frame set within the transmitted frame is not successfully received at the external device,
otherwise, the successively and successfully received maximum sequence number indicates that all frame sets, from a frame set of the first sequence number after a connection is established to a frame set of the successively and successfully received maximum sequence number, are successively received, at the external device after the connection is established, and
the receiver is configured to receive at most one response frame per the transmitted frame, even if more than two frame sets among the n frame sets have been successfully received by the external device.
2. The terminal according to claim 1, wherein the transmitter is configured to retransmit the data based on whether or not reception of the response frame has begun after a fixed time has elapsed from an end of transmission of the frame including the n frame sets.

3. The terminal according to claim 1, wherein the transmitter is configured to retransmit the data based on the successively and successfully received maximum sequence number.

4. The terminal according to claim 1, wherein the fragment information field includes 1-bit information on one or zero.

5. The terminal according to claim 1, further comprising:
a frequency conversion circuit configured to modulate the n frame sets into a radio signal; and
an antenna configured to transmit the radio signal.

6. The terminal according to claim 5, wherein the antenna is shared by the transmitter and the receiver using a switch.

7. The terminal according to claim 1, wherein the transmitter transmits a frame set of a value by adding 1 to the successively and successfully received maximum sequence number.

8. A wireless communication terminal comprising:
(A) a receiver configured to receive, from an external device, a frame which includes n frame sets each including a subheader field, a frame check sequence field, and a frame body field including data, where n is an integer equal to or greater than 2;
wherein the subheader field includes:
a sequence number field which notifies a sequence number;
a fragment information field which notifies whether or not the data is a last fragment; and
a frame body length field which notifies a length of the frame body field; and
(B) a transmitter configured to transmit, to the external device, a response frame notifying a successively and successfully received maximum sequence number after a fixed time has elapsed from an end of reception of the frame including the n frame sets,
wherein:
the successively and successfully received maximum sequence number indicates a value obtained by subtracting 1 from a first sequence number, if any frame set within the frame is not successfully received,
otherwise, the successively and successfully received maximum sequence number indicates that all frame sets, from a frame set of the first sequence number after a connection is established to a frame set of the successively and successfully received maximum sequence number, are successively received, after the connection is established, and
the transmitter is configured to transmit at most one response frame per the received frame, even if more than two frame sets among the n frame sets have been successfully received by the receiver.

9. The terminal according to claim 8, wherein the fragment information field includes 1-bit information on one or zero.

10. The terminal according to claim 8, further comprising:
an antenna configured to receive a radio signal; and
a frequency conversion circuit configured to demodulate the radio signal into the n frame sets.

11. The terminal according to claim 10, wherein the antenna is shared by the transmitter and the receiver using a switch.

12. The terminal according to claim 8, wherein the receiver is configured to execute a defragment process of the data based on the fragment information field.

13. The terminal according to claim 12, wherein when there is remaining fragmented data following the data included in the frame body field as determined by checking the fragment information field, the receiver is configured to execute the defragment process of the data and the remaining fragmented data.

14. The terminal according to claim 12, wherein the data or defragmented data including the data is passed to an upper layer processor, when the frame body field indicates that the sequence number is not more than the successively and successfully received maximum sequence number and the fragment information field indicates that the data is the last fragment.

15. A wireless communication method comprising:
(A) transmitting, to an external device, a frame which includes n frame sets each including a subheader field, a frame check sequence field, and a frame body field including data, where n is an integer equal to or greater than 2;
wherein the subheader field includes:
a sequence number field which notifies a sequence number;
a fragment information field which notifies whether or not the data is a last fragment; and
a frame body length field which notifies a length of the frame body field; and
(B) receiving, from the external device, a response frame notifying a successively and successfully received maximum sequence number,
wherein:
the successively and successfully received maximum sequence number indicates a value obtained by subtracting 1 from a first sequence number, if any frame set within the transmitted frame is not successfully received at the external device,
otherwise, the successively and successfully received maximum sequence number indicates that all frame sets, from a frame set of the first sequence number after a connection is established to a frame set of the successively and successfully received maximum sequence number, are successively received, at the external device after the connection is established, and
the receiving receives at most one response frame per the transmitted frame, even if more than two frame sets among the n frame sets have been successfully received by the external device.

16. The method according to claim 15, wherein the transmitting retransmits the data based on whether or not reception of the response frame has begun after a fixed time has elapsed from an end of transmission of the frame including the n frame sets.

17. The method according to claim 15, wherein the transmitting retransmits the data based on the successively and successfully received maximum sequence number.

18. The method according to claim 15, wherein the transmitting transmits a frame set of a value by adding 1 to the successively and successfully received maximum sequence number.

19. A wireless communication method comprising:
(A) receiving, from an external device, a frame which includes n frame sets each including a subheader field, a frame check sequence field, and a frame body field including data, where n is an integer equal to or greater than 2;
wherein the subheader field includes:
a sequence number field which notifies a sequence number;
a fragment information field which notifies whether or not the data is a last fragment; and a frame body length field which notifies a length of the frame body field; and (B) transmitting, to the external device, a response frame notifying a successively and successfully received maximum sequence number after a fixed time has elapsed from an end of reception of the frame including the n frame sets, wherein:

the successively and successfully received maximum sequence number indicates a value obtained by subtracting 1 from a first sequence number, if any frame set within the frame is not successfully received, otherwise, the successively and successfully received maximum sequence number indicates that all frame sets, from a frame set of the first sequence number after a connection is established to a frame set of the successively and successfully received maximum sequence number, are successively received, after the connection is established, and the transmitting transmits at most one response frame per the received frame, even if more than two frame sets among the n frame sets have been successfully received by the receiver.

20. The method according to claim 19, wherein the receiving executes a defragment process of the data based on the fragment information field.

21. The method according to claim 20, wherein when there is remaining fragmented data following the data included in the frame body field as determined by checking the fragment information field, the receiving executes the defragment process of the data and the remaining fragmented data.

22. The method according to claim 20, wherein the data or defragmented data including the data is passed to an upper layer processor, when the frame body field indicates that the sequence number is not more than the successively and successfully received maximum sequence number and the fragment information field indicates that the data is the last fragment.

* * * * *